US012431620B2

(12) United States Patent
Kobayashi et al.

(10) Patent No.: US 12,431,620 B2
(45) Date of Patent: Sep. 30, 2025

(54) PHASED ARRAY ANTENNA

(71) Applicants: Fujikura Ltd., Tokyo (JP); International Business Machines Corporation, New York, NY (US)

(72) Inventors: Kiyoshi Kobayashi, Sakura (JP); Ken Sakuma, Sakura (JP); Mark Yeck, Bloomingdale, NJ (US); Bodhisatwa Sadhu, Yorktown Heights, NY (US); Arun Paidimarri, New York, NY (US)

(73) Assignees: Fujikura Ltd., Tokyo (JP); International Business Machines Corporation, Armonk, NY (US)

( * ) Notice: Subject to any disclaimer, the term of this patent is extended or adjusted under 35 U.S.C. 154(b) by 413 days.

(21) Appl. No.: 18/016,723

(22) PCT Filed: Feb. 8, 2021

(86) PCT No.: PCT/US2021/017016
§ 371 (c)(1),
(2) Date: Jan. 18, 2023

(87) PCT Pub. No.: WO2022/169463
PCT Pub. Date: Aug. 11, 2022

(65) Prior Publication Data
US 2023/0282976 A1 Sep. 7, 2023

(51) Int. Cl.
*H01Q 3/28* (2006.01)
*H01Q 3/38* (2006.01)
*H04B 7/06* (2006.01)

(52) U.S. Cl.
CPC ............... *H01Q 3/38* (2013.01); *H01Q 3/28* (2013.01); *H04B 7/0617* (2013.01)

(58) Field of Classification Search
CPC .......... H01Q 3/38; H01Q 3/28; H04B 7/0617
See application file for complete search history.

(56) References Cited

U.S. PATENT DOCUMENTS

| 4,517,570 A | 5/1985 | Gray, Jr. |
| 6,728,294 B1 * | 4/2004 | Kohno ............... H04B 7/0408 375/267 |

(Continued)

FOREIGN PATENT DOCUMENTS

| JP | 2001-326525 A | 11/2001 |
| JP | 2003-347978 A | 12/2003 |

(Continued)

OTHER PUBLICATIONS

Office Action dated Apr. 30, 2024, issued in counterpart JP Application No. 2023-501398, with English translation. (8 pages).

(Continued)

*Primary Examiner* — Henry Luong

(57) ABSTRACT

A phased array antenna (1) includes: a plurality of antenna elements (11a to 11d); a plurality of signal paths (R11 and R12) that are connected to each of the antenna elements; a storage unit (M) configured to store a set values of at least one of amplitudes or phases of a signal passed through at least one predefined reference path among the plurality of signal paths with regard to at least one of the antenna elements, and an amplitude and phase control unit (22 or 26) configured to control at least one of the amplitude or the phase of the signal passed through the reference path connected to the antenna element by using the set value stored in the storage unit, and configured to control amplitude or phase of signal passed through the signal path other than the reference path.

10 Claims, 16 Drawing Sheets

(56) References Cited

U.S. PATENT DOCUMENTS

| | | | |
|---|---|---|---|
| 2011/0105032 A1* | 5/2011 | Maruhashi | H04B 7/0617 455/59 |
| 2014/0132450 A1 | 5/2014 | Chen et al. | |
| 2018/0191418 A1 | 7/2018 | Xia et al. | |
| 2021/0011116 A1 | 1/2021 | Ainspan et al. | |

FOREIGN PATENT DOCUMENTS

| | | | |
|---|---|---|---|
| JP | 2005-020280 A | 1/2005 |
| JP | 2005-311780 A | 11/2005 |
| JP | 2016-116209 A | 6/2016 |
| JP | 2018-19384 A | 2/2018 |
| JP | 2019-212947 A | 12/2019 |
| WO | 2020/032847 A1 | 2/2020 |

OTHER PUBLICATIONS

EE Times Japan, "Fujikura commercializes PAAM for 5G using millimeter wave", Oct. 27, 2020; cited in JP Office Action dated Apr. 30, 2024.

International Search Report dated Apr. 16, 2021, issued in counterpart International Application No. PCT/US2021/017016. (1 page).

Fujikura ., "Fujikura enters 5G mmWave infrastructure market with the introduction of industry's highest performance, and low power consumption Phased Array Antenna Module (PAAM)", Oct. 23, 2020, Cited in ISR. (9 pages).

\* cited by examiner

| BEAM PATTERN INDEX | SET VALUE | | | |
|---|---|---|---|---|
| | 1 | 2 | 3 | 4 |
| 1 | C11 | C12 | C13 | C14 |
| 2 | C21 | C22 | C23 | C24 |
| 3 | .. | .. | .. | .. |
| 4 | .. | .. | .. | .. |
| 5 | .. | .. | .. | .. |
| 6 | .. | .. | .. | .. |
| 7 | .. | .. | .. | .. |
| 8 | C81 | C82 | C83 | C84 |

TB1

| BEAM PATTERN INDEX (V or H) | SET VALUE | | | |
|---|---|---|---|---|
| | 1 | 2 | 3 | 4 |
| 1 | C11 | C12 | C13 | C14 |
| 2 | C21 | C22 | C23 | C24 |
| 3 | .. | .. | .. | .. |
| 4 | .. | .. | .. | .. |
| 5 | .. | .. | .. | .. |
| 6 | .. | .. | .. | .. |
| 7 | .. | .. | .. | .. |
| 8 | C81 | C82 | C83 | C84 |

| BEAM PATTERN INDEX (V) | SET VALUE V  TB31 | | | | BEAM PATTERN INDEX (H) | SET VALUE H  TB32 | | | |
|---|---|---|---|---|---|---|---|---|---|
| | 1 | 2 | 3 | 4 | | 1 | 2 | 3 | 4 |
| 1 | CV11 | CV12 | CV13 | CV14 | 1 | CH11 | CH12 | CH13 | CH14 |
| 2 | CV21 | CV22 | CV23 | CV24 | 2 | CH21 | CH22 | CH23 | CH24 |
| 3 | .. | .. | .. | .. | 3 | .. | .. | .. | .. |
| 4 | .. | .. | .. | .. | 4 | .. | .. | .. | .. |
| 5 | .. | .. | .. | .. | 5 | .. | .. | .. | .. |
| 6 | .. | .. | .. | .. | 6 | .. | .. | .. | .. |
| 7 | .. | .. | .. | .. | 7 | .. | .. | .. | .. |
| 8 | CV81 | CV82 | CV83 | CV84 | 8 | CH81 | CH82 | CH83 | CH84 |

FIG. 6A

| BEAM PATTERN INDEX (TRANSMISSION) | SET VALUE T ↗ TB41 | | | | BEAM PATTERN INDEX (RECEPTION) | SET VALUE R ↗ TB42 | | | |
|---|---|---|---|---|---|---|---|---|---|
| | 1 | 2 | 3 | 4 | | 1 | 2 | 3 | 4 |
| 1 | CT11 | CT12 | CT13 | CT14 | 1 | CR11 | CR12 | CR13 | CR14 |
| 2 | CT21 | CT22 | CT23 | CT24 | 2 | CR21 | CR22 | CR23 | CR24 |
| 3 | .. | .. | .. | .. | 3 | .. | .. | .. | .. |
| 4 | .. | .. | .. | .. | 4 | .. | .. | .. | .. |
| 5 | .. | .. | .. | .. | 5 | .. | .. | .. | .. |
| 6 | .. | .. | .. | .. | 6 | .. | .. | .. | .. |
| 7 | .. | .. | .. | .. | 7 | .. | .. | .. | .. |
| 8 | CT81 | CT82 | CT83 | CT84 | 8 | CR81 | CR82 | CR83 | CR84 |

| BEAM PATTERN INDEX | SET VALUE (TB51) | | | | CORRECTION VALUE (TB52) | | | |
|---|---|---|---|---|---|---|---|---|
| | 1 | 2 | 3 | 4 | 1 | 2 | 3 | 4 |
| 1 | T11 | T12 | T13 | T14 | C1 | C2 | C3 | C4 |
| 2 | T21 | T22 | T23 | T24 | | | | |
| 3 | .. | .. | .. | .. | | | | |
| 4 | .. | .. | .. | .. | | | | |
| 5 | .. | .. | .. | .. | | | | |
| 6 | .. | .. | .. | .. | | | | |
| 7 | .. | .. | .. | .. | | | | |
| 8 | T81 | T82 | T83 | T84 | | | | |

FIG. 8A

| BEAM PATTERN INDEX (V or H) | SET VALUE | | | |
|---|---|---|---|---|
| | 1 | 2 | 3 | 4 |
| 1 | TV11 | TV12 | TV13 | TV14 |
| 2 | TV21 | TV22 | TV23 | TV24 |
| 3 | . . | . . | . . | . . |
| 4 | . . | . . | . . | . . |
| 5 | . . | . . | . . | . . |
| 6 | . . | . . | . . | . . |
| 7 | . . | . . | . . | . . |
| 8 | TV81 | TV82 | TV83 | TV84 |

TB61

| CORRECTION VALUE A | | | |
|---|---|---|---|
| 1 | 2 | 3 | 4 |
| CA1 | CA2 | CA3 | CA4 |

TB62

| CORRECTION VALUE B | | | |
|---|---|---|---|
| 1 | 2 | 3 | 4 |
| CB1 | CB2 | CB3 | CB4 |

TB63

| CORRECTION VALUE C | | | |
|---|---|---|---|
| 1 | 2 | 3 | 4 |
| CC1 | CC2 | CC3 | CC4 |

| BEAM PATTERN INDEX (V or H) | SET VALUE | | | |
|---|---|---|---|---|
| | 1 | 2 | 3 | 4 |
| 1 | TV11 | TV12 | TV13 | TV14 |
| 2 | TV21 | TV22 | TV23 | TV24 |
| 3 | .. | .. | .. | .. |
| 4 | .. | .. | .. | .. |
| 5 | .. | .. | .. | .. |
| 6 | .. | .. | .. | .. |
| 7 | .. | .. | .. | .. |
| 8 | TV81 | TV82 | TV83 | TV84 |

TB82

| CORRECTION INDEX A | CORRECTION VALUE A | | | |
|---|---|---|---|---|
| | 1 | 2 | 3 | 4 |
| 1 | CA1_1 | CA2_1 | CA3_1 | CA4_1 |
| 2 | CA1_2 | CA2_2 | CA3_2 | CA4_2 |

TB83

| CORRECTION INDEX B | CORRECTION VALUE B | | | |
|---|---|---|---|---|
| | 1 | 2 | 3 | 4 |
| 1 | CB1_1 | CB2_1 | CB3_1 | CB4_1 |
| 2 | CB1_2 | CB2_2 | CB3_2 | CB4_2 |

TB84

| CORRECTION INDEX C | CORRECTION VALUE C | | | |
|---|---|---|---|---|
| | 1 | 2 | 3 | 4 |
| 1 | CC1_1 | CC2_1 | CC3_1 | CC4_1 |
| 2 | CC1_2 | CC2_2 | CC3_2 | CC4_2 |

FIG. 10B

| BEAM PATTERN INDEX (V) | CORRECTION INDEX A |
|---|---|
| 1 | 2 |
| 2 | 1 |
| 3 | 1 |
| 4 | 2 |
| 5 | 2 |
| 6 | 2 |
| 7 | 1 |
| 8 | 1 |

| BEAM PATTERN INDEX (H) | CORRECTION INDEX B | CORRECTION INDEX C |
|---|---|---|
| 1 | 1 | 2 |
| 2 | 2 | 2 |
| 3 | 1 | 1 |
| 4 | 2 | 2 |
| 5 | 1 | 1 |
| 6 | 1 | 1 |
| 7 | 2 | 2 |
| 8 | 2 | 1 |

FIG. 11

| BEAM PATTERN INDEX | SET VALUE (TB91) | | | | SET VALUE T (TB92) | | | | SET VALUE R (TB93) | | | |
|---|---|---|---|---|---|---|---|---|---|---|---|---|
| | 1 | 2 | 3 | 4 | 1 | 2 | 3 | 4 | 1 | 2 | 3 | 4 |
| 1 | C11 | C12 | C13 | C14 | | | | | | | | |
| 2 | C21 | C22 | C23 | C24 | | | | | | | | |
| 3 | .. | .. | .. | .. | | | | | | | | |
| 4 | .. | .. | .. | .. | | | | | | | | |
| 5 | .. | .. | .. | .. | | | | | | | | |
| 6 | C61 | C62 | C63 | C64 | | | | | | | | |
| 7 | | | | | T71 | T72 | T73 | T74 | R71 | R72 | R73 | R74 |
| 8 | | | | | T81 | T82 | T83 | T84 | R81 | R82 | R83 | R84 |

TB90

PHASED ARRAY ANTENNA

TECHNICAL FIELD

The present invention relates to a phased array antenna.

BACKGROUND ART

A phased array antenna is an antenna whose beam pattern can be changed freely by adjusting at least one of the amplitudes or phases (i.e., adjusting only amplitudes or only phases or both of the amplitudes and the phases) of signals (transmission signals) fed to a plurality of antenna elements or signals (reception signals) fed from the plurality of antenna elements. In recent years, such phased array antennas have been used in various fields such as automobiles, communications, and others.

The following Patent Literature 1 discloses an example of a phased array antenna in the related art. This phased array antenna includes a plurality of antenna elements, a plurality of amplitude and phase controllers corresponding to the plurality of antenna elements, and a memory that stores set values of amplitudes and phases for the plurality of amplitude and phase controllers. Then, a required antenna beam pattern is formed by setting the set values stored in the memory in the amplitude and phase controller, and adjusting amplitudes and phases of a plurality of signals fed from the plurality of antenna elements.

CITATION LIST

Patent Literature

[Patent Literature 1]
Japanese Unexamined Patent Application, First Publication No. 2019-212947

SUMMARY OF INVENTION

Technical Problem

The phased array antenna in the related art adjusts the amplitudes and the phases of the plurality of signals fed from the plurality of antenna elements with reference to the set values stored in the memory, as described above. Therefore, there is a problem in that a large amount of memory is required as the number of antenna beam patterns, the number of antenna elements, and the number of transmissions and receptions and polarizations increase.

For example, when there are eight antenna beam patterns, four antenna elements, and two transmissions and receptions (i.e., one transmission and one reception), the amount of memory required is 64 words (obtained by multiplying these elements, i.e., 8×4×2). In addition, when transmitting and receiving signals of vertical (V) polarization and horizontal (H) polarization, 128 words (obtained by further multiplying the number of polarizations by two) are required. One word is a set value of an amplitude and a phase set in one amplitude and phase controller.

The present invention has been made in view of the above circumstances, and an object thereof is to provide a phased array antenna capable of reducing the amount of memory required to form a desired antenna beam pattern.

Solution to Problem

According to an aspect of the present invention, a phased array antenna is provided including: a plurality of antenna elements; a plurality of signal paths that are connected to each of the antenna elements; a storage unit configured to store a set values of at least one of amplitudes or phases of a signal passed through at least one predefined reference path among the plurality of signal paths with regard to at least one of the antenna elements, the set value for at least one of antenna beam patterns to be set; and an amplitude and phase control unit configured to control at least one of the amplitude or the phase of the signal passed through the reference path connected to the antenna element that the set value thereof is stored in the storage unit, by using the set value stored in the storage unit, and configured to control amplitude or phase of signal passed through the signal path other than the reference path connected to the antenna element, by using the set value stored in the storage unit.

In the phased array antenna according to the above aspect, for at least one of the antenna elements that are connected to the plurality of signal paths, the set value of at least one of the amplitude or phase of the signal passed through at least one predefined reference path among the plurality of signal paths for at least one of antenna beam patterns to be set, are stored in the storage unit.

Then, for the antenna element that the set value thereof is stored in the storage unit, at least one of the amplitude or the phase of the signals passed through the reference path and also the signal paths other than the reference path are controlled by using the set value stored in the storage unit.

As described above, in the phased array antenna according to the above aspect, for the antenna element that the set value thereof is stored in the storage unit, since it is sufficient to store the set value related to the reference path in the storage unit, and it is not necessary to store the set value of the signal path other than the reference path in the storage unit, the amount of memory required to form the desired antenna beam patterns can be reduced.

The storage unit may be configured to store the set values for all of the antenna elements.

In the phased array antenna according to the above aspect, the storage unit may further store an inter-path error between the reference path and the signal path other than the reference path, and the amplitude and phase control unit may control at least one of the amplitude or the phase of the signal passed through the signal path other than the reference path, by using a corrected set value obtained by correcting the set value stored in the storage unit by the inter-path error.

In the phased array antenna according to the above aspect, the storage unit may store a plurality of the inter-path errors, and the amplitude and phase control unit may select one of the inter-path errors depending on the antenna beam patterns to be set.

In the phased array antenna according to the above aspect, the plurality of signal paths may include transmission signal paths through which a plurality of transmission signals transmitted from each of the antenna elements are passed, and reception signal paths through which a plurality of reception signals received by each of the antenna elements are passed.

In the phased array antenna according to the above aspect, the plurality of signal paths may include a first transmission signal path through which transmission signal, which is transmitted as a signal in a first polarization state from each of the antenna elements, is passed, a first reception signal path through which a reception signal, which is obtained by receiving the signal in the first polarization state by each of the antenna elements, is passed, a second transmission signal path through which a transmission signal, which is transmitted as a signal in a second polarization state from each of the antenna elements, is passed, and a second reception signal path through which a reception signal, which is obtained by receiving the signals in the second polarization state by each of the antenna elements, is passed.

The phased array antenna according to the above aspect may further include a switching unit configured to sequentially switch the signal paths.

In the phased array antenna according to the above aspect, the set values may be provided as many as the number of the antenna beam patterns to be set.

In the phased array antenna according to the above aspect, the set values may be provided only for part of the antenna beam patterns to be set.

According to another aspect of the present invention, a phased array antenna is provided including: a plurality of antenna elements; a first transmission signal path through which a transmission signal, which is transmitted as a signal in a first polarization state from each of the antenna elements, is passed; a first reception signal path through which a reception signal, which is obtained by receiving the signal in the first polarization state by each of the antenna elements, is passed; a second transmission signal path through which a transmission signal, which is transmitted as a signal in a second polarization state from each of the antenna elements, is passed; a second reception signal path through which a reception signal, which is obtained by receiving the signal in the second polarization state by each of the antenna elements, is passed; a storage unit configured to store a first set value and a second set value for all of the antenna beam patterns to be set with regard to all of the antenna elements, the first set value being a set value of at least one of an amplitude or a phase of any one of the transmission signal passed through the first transmission signal path and the reception signal passed through the first reception signal path, the second set value being a set value of at least one of an amplitude or a phase of any one of the transmission signal passed through the second transmission signal path and the reception signal passed through the second reception signal path; and an amplitude and phase control unit configured to control at least one of the amplitudes or the phases of the transmission signal passed through the first transmission signal path and the reception signal passed through the first reception signal path, by using the first set value stored in the storage unit, and configured to control at least one of the amplitudes or the phases of the transmission signal passed through the second transmission signal path and the reception signal passed through the second reception signal path, by using the second set value stored in the storage unit.

Advantageous Effects of Invention

According to one or more aspects of the present invention, the amount of memory required to form the desired antenna beam patterns can be reduced.

BRIEF DESCRIPTION OF DRAWINGS

FIG. 5A is a diagram showing an example of the contents of a memory according to a third embodiment.
FIG. 6A is a diagram showing an example of the contents of a memory according to the fourth embodiment.
FIG. 8A is a diagram showing an example of the contents of a memory according to a sixth embodiment.
FIG. 10A is a diagram showing an example of the contents of a memory according to an eighth embodiment.
FIG. 10B is a diagram showing a selection example of a correction index according to the eighth embodiment.
FIG. 11 is a diagram showing another example of the contents of the memory.

DESCRIPTION OF EMBODIMENTS

Hereinafter, a phased array antenna according to embodiments of the present invention will be described in detail with reference to the drawings.

First Embodiment

Figure 1:
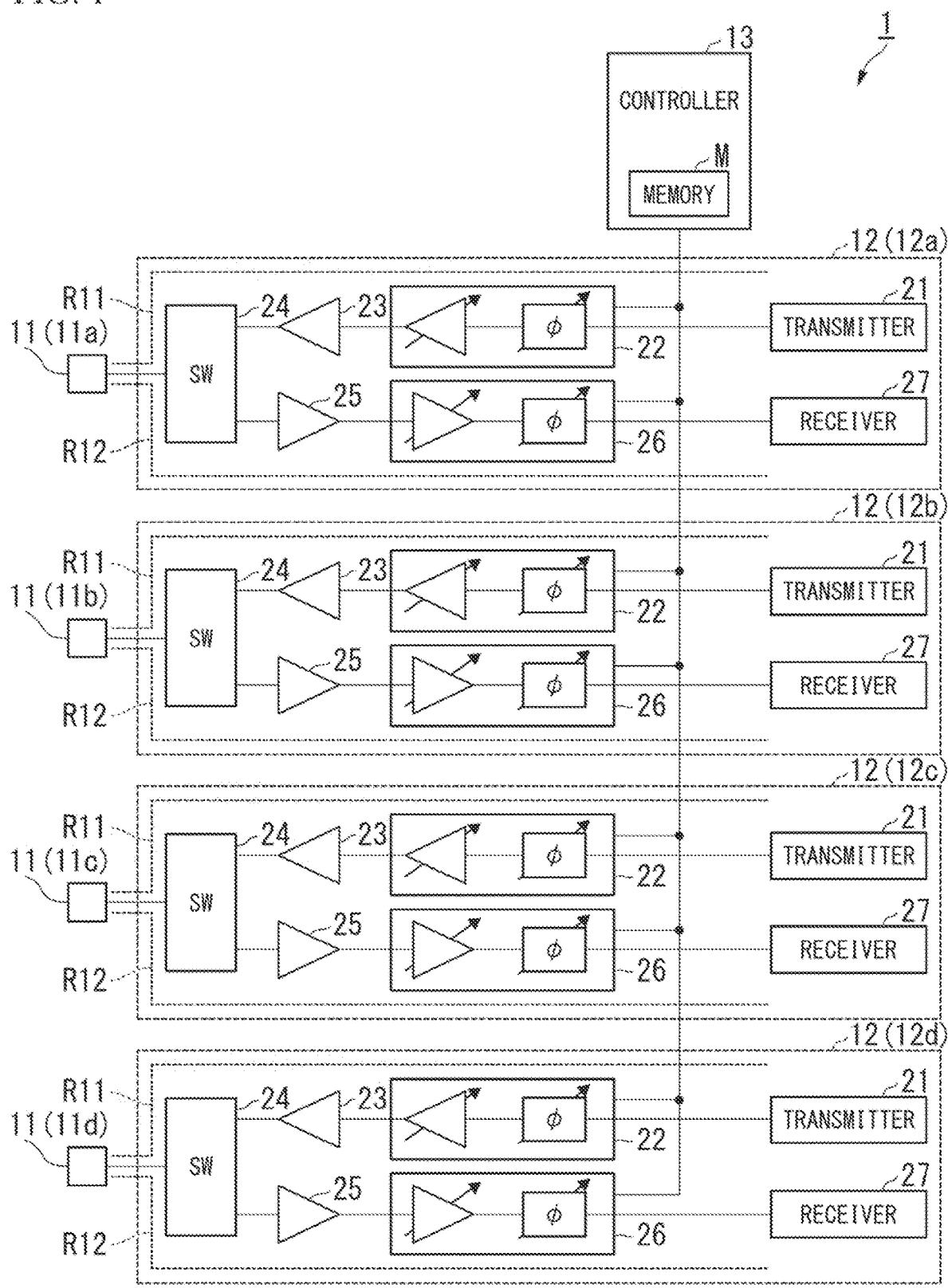
FIG. 1 is a block diagram showing a configuration of a main part of a phased array antenna according to a first embodiment.

FIG. 1 is a block diagram showing a configuration of a main part of a phased array antenna according to a first embodiment. As shown in FIG. 1, a phased array antenna 1 of the present embodiment includes antenna elements 11a to 11d, transmission/reception units 12a to 12d, and a controller 13, and transmits and receives radio signals by a time division duplex (TDD) system. The phased array antenna 1 can change an antenna beam pattern by controlling the controller 13.

The phased array antenna 1 transmits and receives radio signals in a millimeter wave band having a frequency of, for example, about 30 to 300 [GHz]. The radio signal transmitted and received by the phased array antenna 1 is not limited to the radio signal in the millimeter wave band, and may be a radio signal other than the millimeter wave band.

In the following, the four antenna elements 11a to 11d are collectively referred to as an antenna element 11, and the four transmission/reception units 12a to 12d are collectively referred to as a transmission/reception unit 12. Further, the numbers of antenna elements 11 and transmission/reception units 12 included in the phased array antenna 1 are not limited to four, and may be three or less, or five or more.

The antenna elements 11a to 11d transmit and receive radio signals. Specifically, the antenna elements 11a to 11d convert transmission signals output from the transmission/reception units 12a to 12d into electromagnetic waves and transmit them, respectively, and also receive electromagnetic waves transmitted from the outside, convert them into signals (reception signals), and output them to the transmission/reception units 12a to 12d, respectively. The antenna elements 11a to 11d are, for example, arranged in a two-dimensional manner at predefined intervals to form an array antenna. The antenna elements 11a to 11d may be linear antennas, planar antennas, microstrip antennas, patch antennas, or other antennas.

The transmission/reception units 12a to 12d are provided corresponding to the antenna elements 11a to 11d, output transmission signals to the corresponding antenna elements 11a to 11d, and receive reception signals output from the corresponding antenna elements 11a to 11d. Further, the transmission/reception units 12a to 12d are configured to control at least one of amplitudes or phases (i.e., control amplitudes only, or phases only, or both of the amplitudes and the phases) of the transmission signals output to the corresponding antenna elements 11a to 11d, and are configured to control at least one of amplitudes or phases of the reception signals output from the corresponding antenna elements 11a to 11d, under the control of the controller 13. In order to simplify the explanation, it is assumed that the transmission/reception units 12a to 12d are configured to control both of the amplitudes and the phases of the transmission signals and the reception signals hereafter. However, the transmission/reception units 12a to 12d may be configured to control only amplitudes or only phases of the transmission signals and the reception signals.

The transmission/reception units 12a to 12d each include a transmitter 21, an amplitude and phase controller 22 (an amplitude and phase control unit), an amplifier 23, a switch 24 (a switching unit), an amplifier 25, an amplitude and phase controller 26 (an amplitude and phase control unit), and a receiver 27. Since the transmission/reception units 12a to 12d have the same configuration, the transmission/reception units 12a to 12d will be described below as the transmission/reception unit 12 without distinguishing them.

The transmitter 21, the amplitude and phase controller 22, and the amplifier 23 are configured to transmit a radio signal, and are provided in a signal path R11 (a transmission signal path) through which the transmission signal is passed. The amplifier 25, the amplitude and phase controller 26, and the receiver 27 are configured to receive the radio signal, and are provided in a signal path R12 (a reception signal path) through which the reception signal is passed.

The switch 24 switches between connecting the signal path R11 and connecting the signal path R12 to the antenna element 11 at required time intervals. That is, the switch 24 sequentially switches the signal path to be connected to the antenna element 11 among the signal paths R11 and R12 at required time intervals. As described above, in the present embodiment, one antenna element 11 is shared by the signal paths R11 and R12. When the switch 24 performs the above-mentioned switching, transmission/reception of radio signals is realized by the TDD system.

The transmitter 21 provided in the signal path R11 outputs a transmission signal to be transmitted to the outside. The amplitude and phase controller 22 includes, for example, a variable gain amplifier and a phase shifter, and controls an amplitude and a phase of a transmission signal output from the transmitter 21 (a transmission signal passed through the signal path R11) under the control of the controller 13. Although the details will be described later, the amplitude and phase controller 22 controls the amplitude and the phase of the transmission signal, by using set values stored in a memory M of the controller 13. The amplifier 23 amplifies the power of the transmission signal output from the amplitude and phase controller 22 and outputs the signal to the switch 24.

The amplifier 25 provided in the signal path R12 amplifies the reception signal with low noise output from the antenna element 11 via the switch 24, and outputs the signal to the amplitude and phase controller 26. The amplitude and phase controller 26 includes, for example, a variable gain amplifier and a phase shifter, and controls an amplitude and a phase of a reception signal output from the amplifier 25 (a reception signal passed through the signal path R12) under the control of the controller 13. Although the details will be described later, similarly to the amplitude and phase controller 22, the amplitude and phase controller 26 controls the amplitude and the phase of the reception signal, by using set values stored in the memory M of the controller 13. The receiver 27 performs a reception process of the reception signal output from the amplitude and phase controller 26.

The controller 13 outputs a control signal to the amplitude and phase controllers 22 and 26 provided in each of the transmission/reception units 12a to 12d to form an antenna beam pattern of the phased array antenna 1. The control signal output from the controller 13 includes a set value that defines the amplitude and the phase to be controlled by the amplitude and phase controllers 22 and 26 depending on the antenna beam pattern to be formed. The controller 13 includes the memory M (the storage unit) that stores this set value. The controller 13 is composed of, for example, a field programmable gate array (FPGA) and an electrically erasable programmable read-only memory (EEPROM). Alternatively, the controller 13 may be provided inside of an integrated circuit that is integrally combined with the transmission/reception units 12 as an ASIC (Application Specific Integrated Circuit).

Figures 2A, 2B:
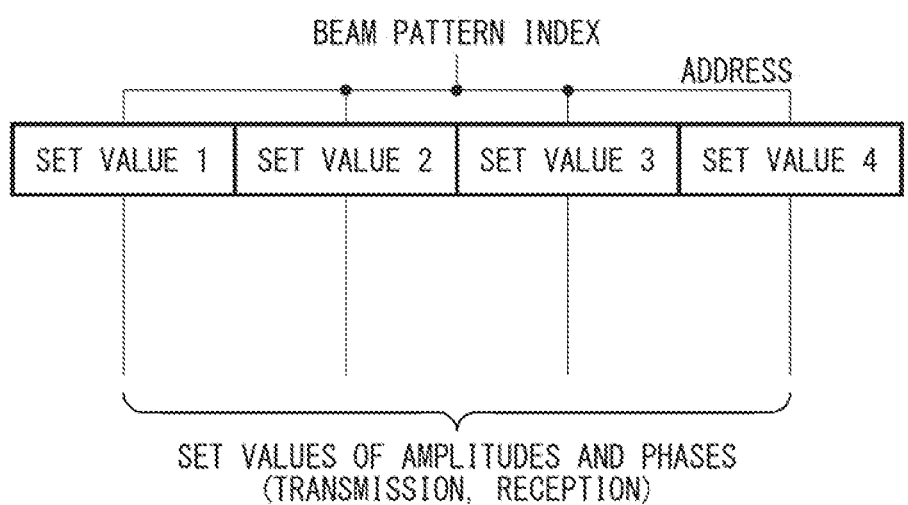
FIG. 2A is a diagram showing an example of the contents of a memory according to the first embodiment.
FIG. 2B is a diagram describing part of a configuration of a controller according to the first embodiment.

FIG. 2A is a diagram showing an example of the contents of the memory according to the first embodiment. In the present embodiment, the memory M of the controller 13 stores a table TB1 in which set values to be set in the amplitude and phase controllers 22 of the transmission/reception units 12a to 12d are defined. That is, the memory M stores the table TB1 in which set values of the amplitudes and the phases of the transmission signals passed through the signal paths R11 (the reference paths) of the transmission/reception units 12a to 12d are defined.

Specifically, as shown in FIG. 2A, the table TB1 defines four set values ("set value 1" to "set value 4") for each of beam pattern indexes. Here, the beam pattern index is an index for specifying the antenna beam pattern to be formed. In the example shown in FIG. 2A, eight types of beam pattern indexes specified by the numerical values "1" to "8" are prepared. That is, in the phased array antenna 1 of the present embodiment, it is possible to form eight types of antenna beam patterns. Further, the four set values ("set value 1" to "set value 4") are set values to be set in the amplitude and phase controllers 22 of the transmission/reception units 12a to 12d, respectively.

Specifically, "C11", "C21", . . . , and "C81" in FIG. 2A are set values to be set in the amplitude and phase controller 22 of the transmission/reception unit 12a when the beam pattern indexes are 1, 2, . . . , and 8, respectively. Set values "C12", "C22", . . . , and "C82" in FIG. 2B are set values to be set in the amplitude and phase controller 22 of the transmission/reception unit 12b when the beam pattern indexes are 1, 2, . . . , and 8, respectively. In FIG. 2A, the combination of the set values of the amplitudes and the phases are described as C11 or the like. However, the set values of the amplitudes and the set values of the phases may be individually stored for the respective beam pattern indexes.

Similarly, set values "C13", "C23", . . . , and "C83" in FIG. 2B are set values to be set in the amplitude and phase controller 22 of the transmission/reception unit 12c when the beam pattern indexes are 1, 2, . . . , and 8, respectively. Set values "C14", "C24", . . . , and "C84" in FIG. 2B are set values to be set in the amplitude and phase controller 22 of the transmission/reception unit 12d when the beam pattern indexes are 1, 2, . . . , and 8, respectively.

FIG. 2B is a diagram describing part of a configuration of the controller according to the first embodiment. As shown in FIG. 2B, the controller 13 of the present embodiment is configured to output corresponding four set values ("set value 1" to "set value 4") with respect to a designated beam pattern index. The four set values output from the memory M are output to the transmission/reception units 12a to 12d, respectively.

For example, a case where the controller 13 designates a beam pattern index "1" is considered. In this case, the set value "C11" is output as "set value 1" to the amplitude and phase controllers 22 and 26 of the transmission/reception unit 12a, and the set value "C12" is output as "set value 2" to the amplitude and phase controllers 22 and 26 of the transmission/reception unit 12b. Further, the set value "C13" is output as "set value 3" to the amplitude and phase controllers 22 and 26 of the transmission/reception unit 12c, and the set value "C14" is output as "set value 4" to the amplitude and phase controllers 22 and 26 of the transmission/reception unit 12d.

As described above, the table TB1 stored in the memory M is used to control the amplitudes and the phases of the transmission signals passed through the signal paths R11 (the reference paths) of the transmission/reception units 12a to 12d. In addition, the table TB1 is also used to control the amplitudes and the phases of the reception signals passed through the signal paths R12 (the signal paths other than the reference paths) of the transmission/reception units 12a to 12d. That is, the table TB1 is shared by the signal paths R11 and R12.

Next, the operation of the phased array antenna 1 will be described. The operation of the phased array antenna 1 is basically an operation of forming an antenna beam pattern and transmitting/receiving radio signals by the TDD system.

When forming the antenna beam pattern, first, the beam pattern index corresponding to the antenna beam pattern to be formed is specified by the controller 13. Next, four set values ("set value 1" to "set value 4" shown in FIG. 2B) for the designated beam pattern index are output from the memory M. These four set values are output as control signals to the amplitude and phase controllers 22 and 26 of the transmission/reception units 12a to 12d, and the designated amplitude and phase in the signal paths R11 and R12 are set. Thereby, the antenna beam pattern is formed.

When transmitting a radio signal, first, the signal paths R11 of the transmission/reception units 12a to 12d are connected to the antenna elements 11a to 11d by the switches 24, respectively. Next, the transmitters 21 provided in the transmission/reception units 12a to 12d output transmission signals to be transmitted to the outside, respectively. The transmission signals output from the transmitters 21 of the transmission/reception units 12a to 12d are passed through the signal paths R11 provided in the transmission/reception units 12a to 12d, respectively.

The power of these transmission signals are amplified by the amplifiers 23 provided in the transmission/reception units 12a to 12d after the amplitude and the phase are respectively controlled by the amplitude and phase controllers 22 provided in the transmission/reception units 12a to 12d. Then, the transmission signals are fed to the antenna elements 11a to 11d via the switches 24 provided in the transmission/reception units 12a to 12d, respectively. The transmission signals fed to the antenna elements 11a to 11d are converted into electromagnetic waves and transmitted.

When receiving a radio signal, first, the signal paths R12 of the transmission/reception units 12a to 12d are connected to the antenna elements 11a to 11d by the switches 24, respectively. Next, the electromagnetic waves transmitted from the outside are received by the antenna elements 11a to 11d, and the reception signals are output from the antenna elements 11a to 11d to the transmission/reception units 12a to 12d, respectively.

The reception signals output from the antenna elements 11a to 11d are passed via the switches 24 of the transmission/reception units 12a to 12d and then passed through the signal paths R12 of the transmission/reception units 12a to 12d, respectively. These reception signals are amplified with low noise by the amplifiers 25 provided in the transmission/reception units 12a to 12d, and then the amplitudes and the phases are controlled by the amplitude and phase controllers 26 provided in the transmission/reception units 12a to 12d, respectively. Then, the reception signals are fed to the receivers 27 provided in the transmission/reception units 12a to 12d to perform the reception process.

As described above, in the present embodiment, the transmission/reception units 12a to 12d are provided for the antenna elements 11a to 11d, respectively, and the antenna element is shared by the signal path R11 through which the transmission signal is passed and the signal path R12 through which the reception signal is passed. Further, the memory M stores the table TB1 in which the set values of the amplitudes and the phases of the transmission signals passed through the signal paths R11 of the transmission/reception units 12a to 12d are defined.

Then, the amplitude and the phase of the transmission signal passed through the signal path R11 are controlled, and the amplitude and the phase of the reception signal passed through the signal path R12 are controlled, by using the table TB1 stored in the memory M. As described above, in the present embodiment, the table TB1 in which the set values for controlling the amplitude and the phase of the transmission signal can be shared for controlling the amplitude and the phase of the reception signal. Therefore, the amount of memory required to store all of the set values is 32 words. Here, a single combination of a set values of an amplitude and a phase for a single amplitude and phase controller (i.e., amplitude and phase controller 22 or 26) is equivalent to 1 word. If the set values are not shared between the transmission signal and the reception signal, the amount of memory required to store all of the set values is equivalent to 64 words. This means the amount of memory required to form the desired antenna beam pattern can be reduced in the present embodiment.

Second Embodiment

Figure 3:
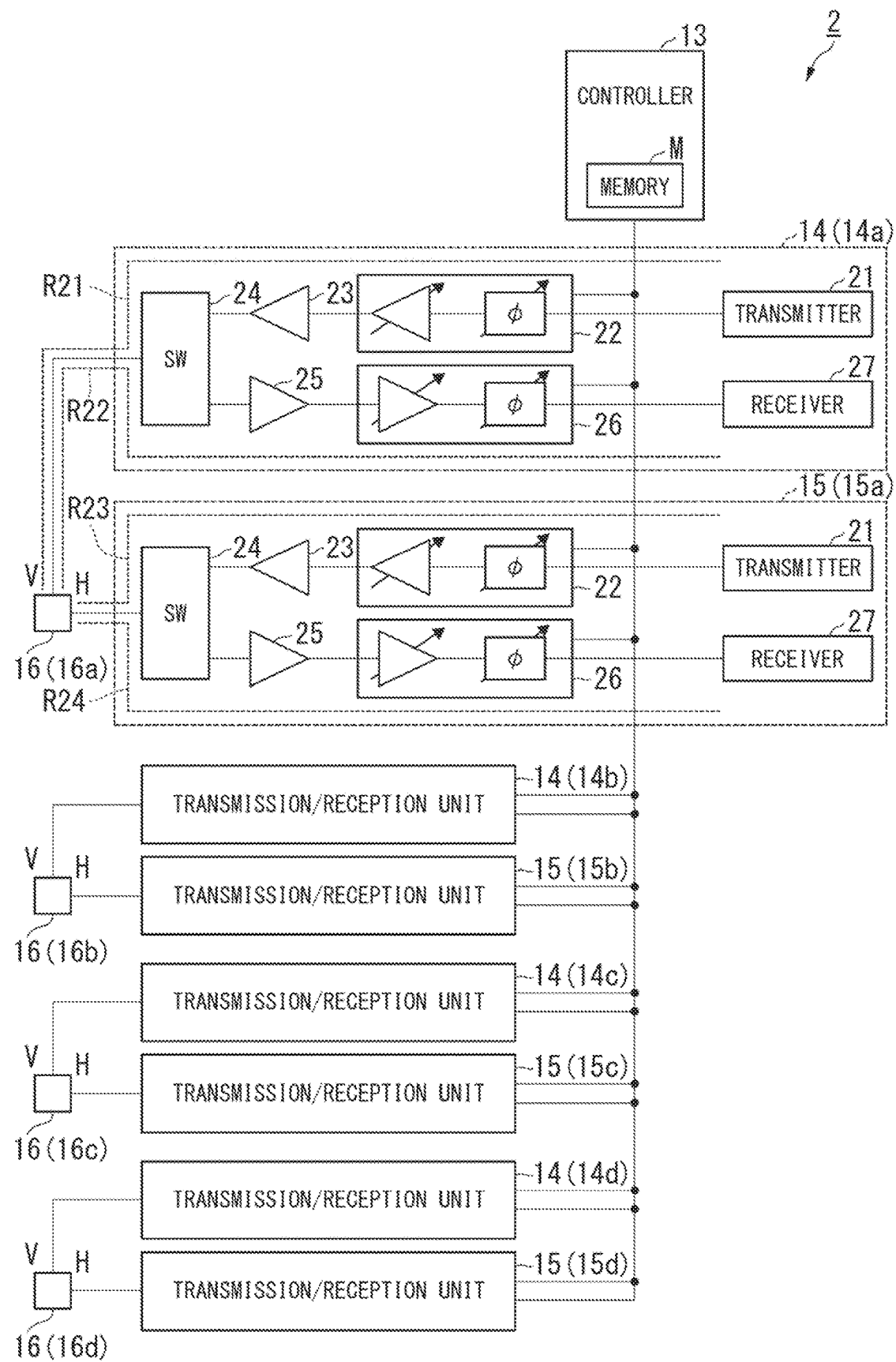
FIG. 3 is a block diagram showing a configuration of a main part of a phased array antenna according to a second embodiment.

FIG. 3 is a block diagram showing a configuration of a main part of a phased array antenna according to a second embodiment. In FIG. 3, the same reference signs are given to the configuration corresponding to the configuration shown in FIG. 1. As shown in FIG. 3, a phased array antenna 2 of the present embodiment is provided with transmission/reception units 14a and 15a instead of the transmission/reception unit 12a of the phased array antenna 1 shown in FIG. 1, transmission/reception units 14b and 15b instead of the transmission/reception unit 12b, transmission/reception units 14c and 15c instead of the transmission/reception unit 12c, and transmission/reception units 14d and 15d instead of the transmission/reception unit 12d.

The phased array antenna 2 of the present embodiment uses the antenna elements 16a to 16d to transmit and receive a signal of vertical polarization (V polarization: first polarization state) and a signal of horizontal polarization (H polarization: second polarization state). In other words, the antenna elements 16a to 16d are shared as the antenna element for V polarization and the antenna element for H polarization by making feeding points for the antenna elements 16a to 16d different.

In the following, the four transmission/reception units 14a to 14d are collectively referred to as a transmission/reception unit 14, and the four transmission/reception units 15a to 15d are collectively referred to as a transmission/reception unit 15. Further, the number of antenna elements 16, transmission/reception units 14, and transmission/reception units 15 included in the phased array antenna 2 is not limited to four, and may be three or less, or five or more. Furthermore, the polarized signals for transmission and reception is not limited to the V polarization signal and the H polarization signal. Any pairs of polarized signals, for example, a right-handed circularly polarized signal and a left-handed circularly polarized wave, or a +45 degree linearly polarized waves and a −45 degree linearly polarized waves, can be used.

The transmission/reception units 14a to 14d are provided corresponding to the antenna elements 16a to 16d, output transmission signals to the corresponding antenna elements 16a to 16d, and receive reception signals output from the corresponding antenna elements 16a to 16d. The transmission/reception units 14a to 14d transmit and receive a signal of V polarization. Further, the transmission/reception units 14a to 14d control amplitudes and phases of the transmission signals output to the corresponding antenna elements 16a to 16d, and control amplitudes and phases of the reception signals output from the corresponding antenna elements 16a to 16d, under the control of the controller 13.

The transmission/reception units 15a to 15d are provided to correspond with the antenna elements 16a to 16d, output transmission signals to the corresponding antenna elements 16a to 16d, and receive reception signals output from the corresponding antenna elements 16a to 16d. The transmission/reception units 15a to 15d transmit and receive a signal of H polarization. Further, the transmission/reception units 15a to 15d control the amplitudes and phases of the transmission signals output to the corresponding antenna elements 16a to 16d, and control the amplitudes and phases of the reception signals output from the corresponding antenna elements 16a to 16d, under the control of the controller 13.

These transmission/reception units 14a to 14d and 15a to 15d have the same configuration as the transmission/reception units 12a to 12d shown in FIG. 1, and they each include the transmitter 21, the amplitude and phase controller 22, the amplifier 23, the switch 24, the amplifier 25, the amplitude and phase controller 26, and the receiver 27. Since the transmission/reception units 14a to 14d and 15a to 15d have the same configuration, the transmission/reception units 14a to 14d will be described below as the transmission/reception unit 14 without distinguishing them and the transmission/reception units 15a to 15d will be described below as the transmission/reception unit 15 without distinguishing them.

The transmitter 21, the amplitude and phase controller 22, and the amplifier 23 of the transmission/reception unit 14 are configured to transmit a radio signal of V polarization, and are provided in a signal path R21 (a transmission signal path, a first transmission signal path) through which the transmission signal is passed. The amplifier 25, the amplitude and phase controller 26, and the receiver 27 of the transmission/reception unit 14 are configured to receive the radio signal of V polarization, and are provided in a signal path R22 (a reception signal path, a first reception signal path) through which the reception signal is passed.

The switch 24 of the transmission/reception unit 14 switches between connecting the signal path R21 and connecting the signal path R22 to the antenna element 16 at required time intervals. That is, the switch 24 of the transmission/reception unit 14 sequentially switches the signal path to be connected to the antenna element 16 among the signal paths R21 and R22 at required time intervals.

The transmitter 21, the amplitude and phase controller 22, and the amplifier 23 of the transmission/reception unit 15 are configured to transmit a radio signal of H polarization, and are provided in a signal path R23 (a transmission signal path, a second transmission signal path) through which the transmission signal is passed. The amplifier 25, the amplitude and phase controller 26, and the receiver 27 of the transmission/reception unit 15 are configured to receive the radio signal of H polarization, and are provided in a signal path R24 (a reception signal path, a second reception signal path) through which the reception signal is passed.

The switch 24 of the transmission/reception unit 15 switches between connecting the signal path R23 and connecting the signal path R24 to the antenna element 16 at required time intervals. That is, the switch 24 of the transmission/reception unit 15 sequentially switches the signal path to be connected to the antenna element 16 among the signal paths R23 and R24 at required time intervals. As described above, in the present embodiment, one antenna element 16 is shared by the four signal paths (the signal paths R21 to R24). When the switches 24 of the transmission/reception units 14 and 15 perform the above-mentioned switching, transmission/reception of radio signals is realized by the TDD system.

Figures 4A, 4B:
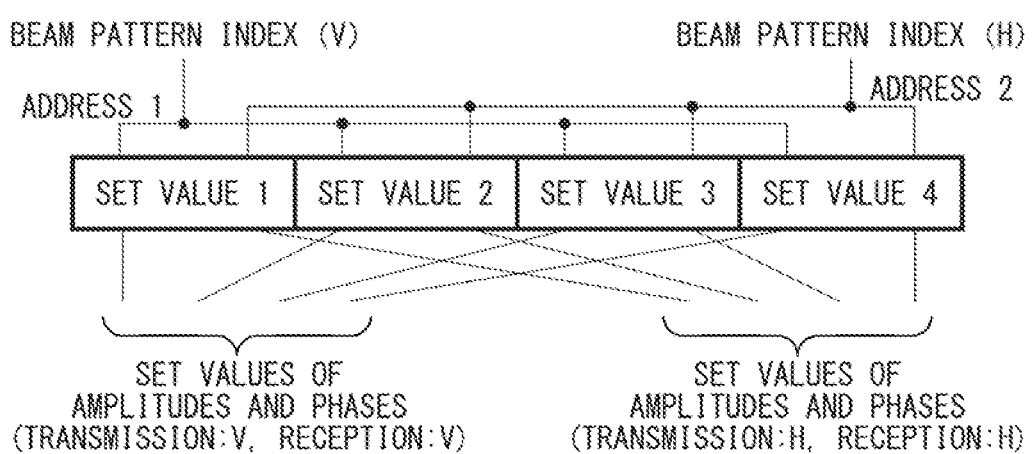
FIG. 4A is a diagram showing an example of the contents of a memory according to the second embodiment.
FIG. 4B is a diagram describing part of a configuration of a controller according to the second embodiment.

FIG. 4A is a diagram showing an example of the contents of the memory according to the second embodiment. In the present embodiment, the memory M of the controller 13 stores a table TB2 in which set values to be set in the amplitude and phase controllers 22 of the transmission/reception units 14a to 14d are defined. That is, the memory M stores the table TB2 in which set values of the amplitudes and the phases of the transmission signals transmitted through the signal paths R21 (the reference paths) of the transmission/reception units 14a to 14d are defined. The table TB2 shown in FIG. 4A is the same as the table TB1 shown in FIG. 2A.

FIG. 4B is a diagram describing part of a configuration of the controller according to the second embodiment. As shown in FIG. 4B, the controller 13 of the present embodiment is configured to output four corresponding set values ("set value 1" to "set value 4") with respect to a designated beam pattern index for V polarization. Further, the controller 13 of the present embodiment is configured to output four corresponding set values ("set value 1" to "set value 4") with respect to a designated beam pattern index for H.

The controller 13 can individually designate the beam pattern index for V polarization and the beam pattern index for H polarization. Here, since different set values can be simultaneously read from the table TB2 for the beam pattern index for V polarization and the beam pattern index for H polarization, it is desirable to use a dual port memory as the memory M. When the controller 13 designates the beam pattern index for V polarization, the four set values output from the controller 13 are output to the transmission/reception units 14a to 14d, respectively. Further, when the controller 13 designates the beam pattern index for H polarization, the four set values output from the controller 13 are output to the transmission/reception units 15a to 15d, respectively.

For example, a case where the controller 13 designates "1" as the beam pattern index for V polarization and "8" as the beam pattern index of H polarization is considered. In this case, the set value "C11" is output as "set value 1" to the amplitude and phase controllers 22 and 26 of the transmission/reception unit 14a, and the set value "C12" is output as "set value 2" to the amplitude and phase controllers 22 and 26 of the transmission/reception unit 14b. Further, the set value "C13" is output as "set value 3" to the amplitude and phase controllers 22 and 26 of the transmission/reception unit 14c, and the set value "C14" is output as "set value 4" to the amplitude and phase controllers 22 and 26 of the transmission/reception unit 14d.

Further, the set value "C81" is output as "set value 1" to the amplitude and phase controllers 22 and 26 of the transmission/reception unit 15a, and the set value "C82" is output as "set value 2" to the amplitude and phase controllers 22 and 26 of the transmission/reception unit 15b. Further, the set value "C83" is output as "set value 3" to the amplitude and phase controllers 22 and 26 of the transmission/reception unit 15c, and the set value "C84" is output as "set value 4" to the amplitude and phase controllers 22 and 26 of the transmission/reception unit 15d.

As described above, the table TB2 stored in the memory M is used to control the amplitudes and the phases of the transmission signals passed through the signal paths R21 (the reference paths) of the transmission/reception units 14a to 14d. In addition, the table TB2 is also used to control the amplitudes and the phases of the reception signals passed through the signal paths R22 of the transmission/reception units 14a to 14d, the signal paths R23 of the transmission/reception units 15a to 15d, and the signal paths R24 (the signal paths other than the reference paths) of the transmission/reception units 15a to 15d. That is, table TB2 is shared by the signal paths R21 to R24.

The phased array antenna 2 of the present embodiment is different from the phased array antenna 1 of the first embodiment in that the controller 13 can individually set a beam pattern index for V polarization and a beam pattern index for H polarization. That is, the phased array antenna 2 of the present embodiment is different from the phased array antenna 1 of the first embodiment in that different antenna beam pattern can be formed between the signal of V polarization and the signal of H polarization. However, since the basic operation of the phased array antenna 2 of the present embodiment is the same as that of the phased array antenna 1 of the first embodiment, detailed description thereof will be omitted.

As described above, in the present embodiment, the transmission/reception units 14a to 14d for transmitting and receiving V polarization and the transmission/reception units 15a to 15d for transmitting and receiving H polarization are provided for the antenna elements 16a to 16d, respectively. Thereby, the antenna element is shared by the four signal paths (the signal paths R21 to R24). Further, the memory M stores the table TB2 in which the set values of the amplitudes and the phases of the transmission signals passed through the signal paths R21 of the transmission/reception units 14a to 14d are defined.

Then, the amplitude and the phase of the transmission signal passed through the signal path R21 are controlled, and the amplitudes and the phases of the signals passed through the signal paths R22 to R24 are controlled, by using the table TB2 stored in the memory M. As described above, in the present embodiment, by sharing the table TB2 in which the set values in one signal path (the signal path R21) among a plurality of signal paths are defined with the other signal paths, the amount of memory required to store all of the set values becomes equivalent to 32 words. If the set values are not shared, the required amount of memory would be 128 words. This means the amount of memory required to form the desired antenna beam pattern can be reduced in the present embodiment.

Third Embodiment

A phased array antenna according to a third embodiment has the same configuration as the phased array antenna 2 shown in FIG. 3. However, the phased array antenna of the present embodiment is different from the phased array antenna 2 shown in FIG. 3 in the contents of the memory M of the controller 13 and part of the configuration of the controller 13.

FIG. 5A is a diagram showing an example of the contents of the memory according to the third embodiment. In the present embodiment, the memory M of the controller 13 stores a table TB31 in which set values to be set in the amplitude and phase controllers 22 of the transmission/reception units 14a to 14d are defined and a table TB32 in which set values to be set in the amplitude and phase controllers 22 of the transmission/reception units 15a to 15d are defined. That is, the table TB31 is a table in which set values (first set values) of the amplitudes and the phases of the transmission signals passed through the signal paths R21 (the reference paths) of the transmission/reception units 14a to 14d are defined. The table TB32 is a table in which set values (second set values) of the amplitudes and the phases of the transmission signals passed through the signal paths R23 (the reference paths) of the transmission/reception units 15a to 15d are defined.

Specifically, as shown in FIG. 5A, the table TB31 defines set values to be set in the amplitude and phase controllers 22 of the transmission/reception units 14a to 14d for each of beam pattern indexes for H polarization. Further, as shown in FIG. 5A, the table TB32 defines set values to be set in the amplitude and phase controllers 22 of the transmission/reception units 15a to 15d for each of beam pattern indexes for H polarization. That is, the tables TB31 and TB32 each have combinations of set values (set value 1 to 4 is equivalent to 1 combination) corresponding to the number of antenna beam patterns to be set (formed). The amount of memory required to store the tables TB31 and TB32 is equivalent to 32 words each. Therefore, in the present embodiment, the amount of memory required to store all the set values is equivalent to 64 words.

Figure 5B:
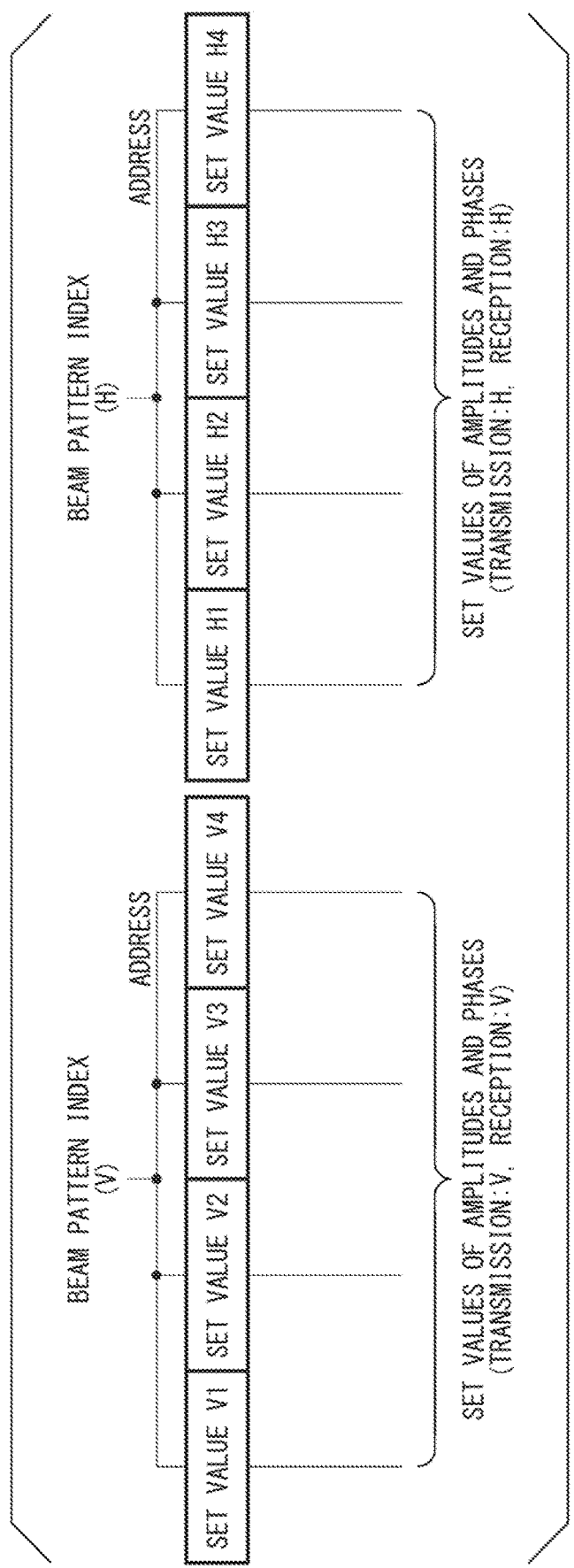
FIG. 5B is a diagram describing part of a configuration of a controller according to the third embodiment.

FIG. 5B is a diagram describing part of a configuration of the controller according to the third embodiment. As shown in FIG. 5B, the controller 13 of the present embodiment is configured to output four corresponding set values ("set value V1" to "set value V4") with respect to a designated beam pattern index for V polarization. Further, the controller 13 of the present embodiment is configured to output four corresponding set values ("set value H1" to "set value H4") with respect to a designated beam pattern index for H polarization.

As in the second embodiment, the controller 13 can individually designate the beam pattern index for V polarization and the beam pattern index for H polarization. However, the present embodiment is different from the second embodiment in that the set values defined in the table TB31 are read in the beam pattern index for V polarization, and the set values defined in the table TB32 are read in the beam pattern index for H polarization. Therefore, in the present embodiment, the memory M does not have to use the dual port memory.

When the beam pattern index for V polarization is designated, the four set values read from the table TB31 of the memory M are output to the amplitude and phase controllers 22 of the transmission/reception units 14a to 14d, respectively, and are output to the amplitude and phase controllers 26 of the transmission/reception units 14a to 14d, respectively. Further, when the beam pattern index for H polarization is designated, the four set values read from the table TB32 of the memory M are output to the amplitude and phase controllers 22 of the transmission/reception units 15a to 15d, respectively, and are output to the amplitude and phase controllers 26 of the transmission/reception units 15a to 15d, respectively.

As described above, the set values defined in the table TB31 are used to control the amplitudes and the phases of the transmission signals passed through the signal paths R21 (the reference paths) of the transmission/reception units 14a to 14d. In addition, the set values defined in the table TB31 are also used to control the amplitudes and the phases of the reception signals passed through the signal paths R22 (the signal paths other than the reference paths) of the transmission/reception units 14a to 14d. That is, the table TB31 of the memory M is shared by the signal paths R21 and R22.

Further, the set values defined in the table TB32 are used to control the amplitudes and the phases of the transmission signals passed through the signal paths R23 (the reference paths) of the transmission/reception units 15a to 15d. In addition, the set values defined in the table TB32 are also used to control the amplitudes and the phases of the reception signals passed through the signal paths R24 (the signal paths other than the reference paths) of the transmission/reception units 15a to 15d. That is, that the table TB32 of the memory M is shared by the signal paths R23 and R24.

The phased array antenna of the present embodiment is different from the phased array antenna 2 of the second embodiment in that the set values used in the transmission/reception units 14a to 14d are defined in the table TB31 and the set values used in the transmission/reception units 15a to 15d are defined in the table TB32. However, since the basic operation of the phased array antenna of the present embodiment is the same as that of the phased array antenna 2 of the second embodiment, detailed description thereof will be omitted.

As described above, in the present embodiment, the antenna element is shared by the four signal paths (the signal paths R21 to R24) as in the second embodiment. Further, the set values for the signal path R21 are stored in the memory M as the table TB31, and the set values for the signal path R23 are stored in the memory M as the table TB32.

Then, the amplitude and the phase of the transmission signal passed through the signal path R21 are controlled, and the amplitude and the phase of the reception signal passed through the signal path R22 are controlled, by using the set values of the table TB31. Further, the amplitude and the phase of the transmission signal passed through the signal path R23 are controlled, and the amplitude and the phase of the reception signal passed through the signal path R24 are controlled, by using the set values of the table TB32.

As described above, in the present embodiment, by sharing the set values for controlling the amplitude and the phase of the transmission signal together with the set values for controlling the amplitude and the phase of the reception signal in each of the transmission/reception units 14a to 14d and the transmission/reception units 15a to 15d, the amount of memory required to store all of the set values becomes equivalent to 64 words. If the set values are not shared, the required amount of memory would be equivalent to 128 words. This means the amount of memory required to form the desired antenna beam pattern can be reduced.

Fourth Embodiment

A phased array antenna according to a fourth embodiment has the same configuration as the phased array antenna 2 shown in FIG. 3. However, the phased array antenna of the present embodiment is different from the phased array antenna 2 shown in FIG. 3 in the contents of the memory M of the controller 13 and part of the configuration of the controller 13.

FIG. 6A is a diagram showing an example of the contents of the memory according to the fourth embodiment. In the present embodiment, the memory M of the controller 13 stores a table TB41 in which set values to be set in the amplitude and phase controllers 22 of the transmission/reception units 14a to 14d are defined, and a table TB42 in which set values to be set in the amplitude and phase controllers 26 of the transmission/reception units 14a to 14d are defined. That is, the table TB41 is a table in which set values (first set values) of the amplitudes and the phases of the transmission signals passed through the signal paths R21 (the reference paths) of the transmission/reception units 14a to 14d are defined. The table TB42 is a table in which set values (second set values) of the amplitudes and the phases of the reception signals passed through the signal paths R22 (the reference paths) of the transmission/reception units 14a to 14d are defined.

Specifically, as shown in FIG. 6A, the table TB41 defines set values to be set in the amplitude and phase controllers 22 of the transmission/reception units 14a to 14d for each of beam pattern indexes for transmission. Further, as shown in FIG. 6A, the table TB42 defines set values to be set in the amplitude and phase controllers 26 of the transmission/reception units 14a to 14d for each of beam pattern indexes for reception. That is, the tables TB41 and TB42 each have combinations of set values (set value 1 to 4 is equivalent to 1 combination) corresponding to the number of antenna beam patterns to be set (formed). The amount of memory required to store the tables TB41 and TB42 is equivalent to 32 words each. Therefore, in the present embodiment, the amount of memory required to store all the set values is equivalent to 64 words as in the third embodiment.

Figure 6B:
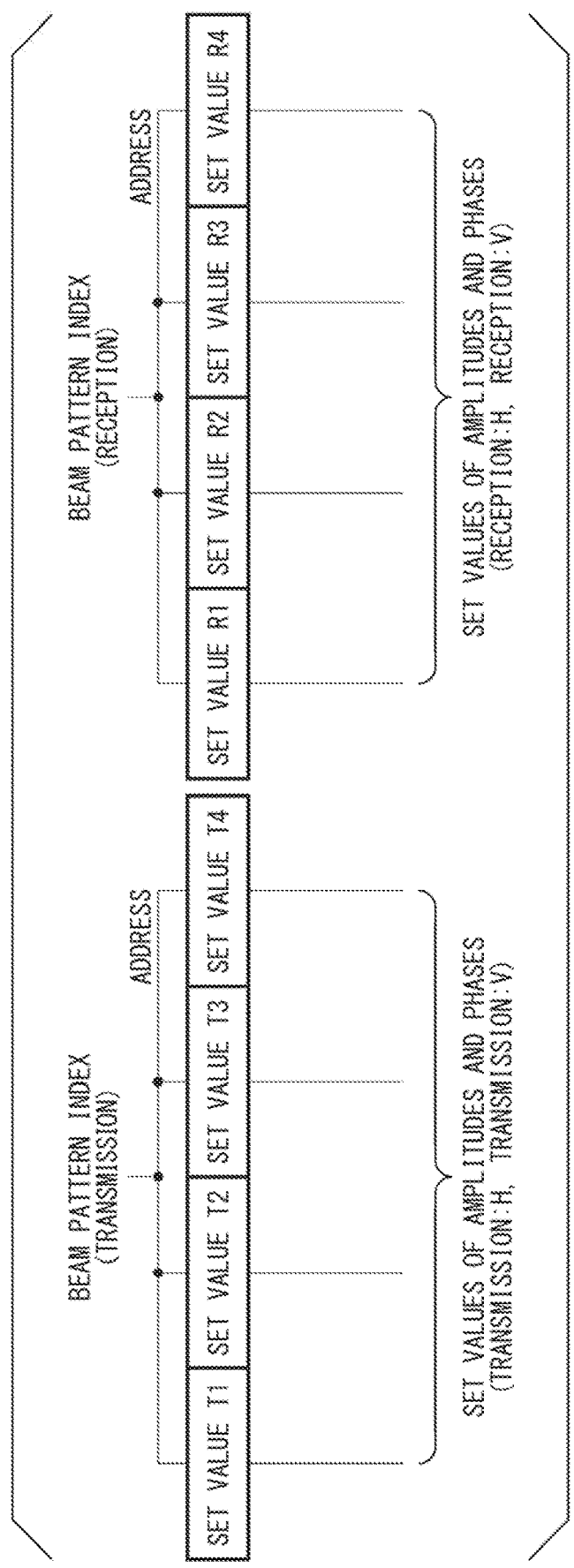
FIG. 6B is a diagram describing part of a configuration of a controller according to the fourth embodiment.

FIG. 6B is a diagram describing part of a configuration of the controller according to the fourth embodiment. As shown in FIG. 6B, the controller 13 of the present embodiment is configured to output four corresponding set values ("set value T1" to "set value T4") with respect to a designated beam pattern index for transmission. Further, the controller 13 of the present embodiment is configured to output four corresponding set values ("set value R1" to "set value R4") with respect to a designated beam pattern index for reception.

The controller 13 can individually designate the beam pattern index for transmission and the beam pattern index for reception. However, the present embodiment is different from the second embodiment in that the set values defined in the table TB41 are read in the beam pattern index for transmission, and the set values defined in the table TB42 are read in the beam pattern index for reception. Therefore, in the present embodiment, the memory M does not have to be the dual port memory.

When the beam pattern index for transmission is designated, the four set values read from the table TB41 are output to the amplitude and phase controllers 22 of the transmission/reception units 14a to 14d, respectively, and are output to the amplitude and phase controllers 22 of the transmission/reception units 15a to 15d, respectively. Further, when the beam pattern index for reception is designated, the four set values read from the table TB42 of the memory M are output to the amplitude and phase controllers 26 of the transmission/reception units 14a to 14d, respectively, and are output to the amplitude and phase controllers 26 of the transmission/reception units 15a to 15d, respectively.

As described above, the set values defined in the table TB41 are used to control the amplitudes and the phases of the transmission signals passed through the signal paths R21 (the reference paths) of the transmission/reception units 14a to 14d. In addition, the set values defined in the table TB41 are also used to control the amplitudes and the phases of the transmission signals passed through the signal paths R23 (the signal paths other than the reference paths) of the transmission/reception units 15a to 15d. That is, the table TB41 is shared by the signal paths R21 and R23.

Further, the set values defined in the table TB42 are used to control the amplitudes and the phases of the reception signals passed through the signal paths R22 (the reference paths) of the transmission/reception units 14a to 14d. In addition, the set values defined in the table TB42 are also used to control the amplitudes and the phases of the reception signals passed through the signal paths R24 (the signal paths other than the reference paths) of the transmission/reception units 15a to 15d. That is, the table TB42 of the memory M is shared by the signal paths R22 and R24.

The phased array antenna of the present embodiment is different from the phased array antenna 2 of the second embodiment in that the set values used in the signal paths R21 and R23 are defined in the table TB41 and the set values used in the signal paths R22 and R24 are defined in the table TB42. However, since the basic operation of the phased array antenna of the present embodiment is the same as that of the phased array antenna 2 of the second embodiment, detailed description thereof will be omitted.

As described above, in the present embodiment, the antenna element is shared by the four signal paths (the signal paths R21 to R24) as in the second embodiment. Further, the set values for the signal path R21 are stored in the memory M as the table T841, and the set values for the signal path R22 are stored in the memory M as the table TB42.

Then, the amplitude and the phase of the transmission signal passed through the signal path R21 are controlled, and the amplitude and the phase of the transmission signal passed through the signal path R23 are controlled, by using the set values of the table TB41. Further, the amplitude and the phase of the reception signal passed through the signal path R22 are controlled, and the amplitude and the phase of the reception signal passed through the signal path R24 are controlled, by using the set values of the table TB42.

As described above, in the present embodiment, by sharing the set values for controlling the amplitude and the phase among the transmission sides and by sharing the set values for controlling the amplitude and the phase among the reception sides of the transmission/reception units 14a to 14d and the transmission/reception units 15a to 15d, the amount of memory required to store all of the set values becomes equivalent to 64 words. If the set values are not shared, the required amount of memory would be 128 words. This means the amount of memory required to form the desired antenna beam pattern can be reduced in the present embodiment.

Fifth Embodiment

A phased array antenna according to a fifth embodiment has the similar configuration as the phased array antenna 1 shown in FIG. 1. However, the phased array antenna of the present embodiment is different from the phased array antenna 1 shown in FIG. 1 in the contents of the memory M of the controller 13 and part of the configuration of the controller 13.

Figures 7A, 7B:
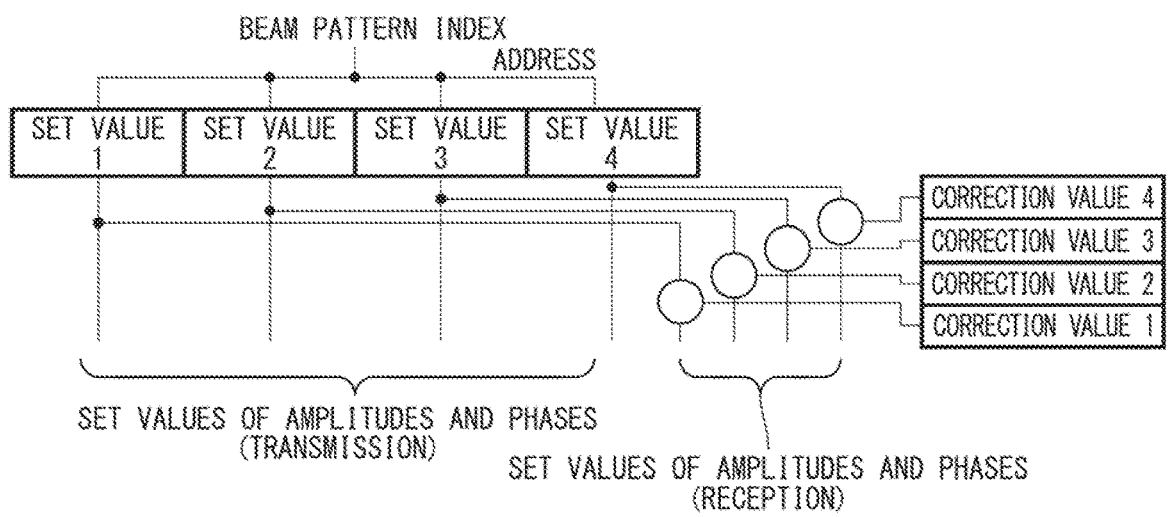
FIG. 7A is a diagram showing an example of the contents of a memory according to a fifth embodiment.
FIG. 7B is a diagram describing part of a configuration of a controller according to the fifth embodiment.

FIG. 7A is a diagram showing an example of the contents of the memory according to the fifth embodiment. In the present embodiment, the memory M of the controller 13 stores a table TB51 in which set values to be set in the amplitude and phase controllers 22 of the transmission/reception units 12a to 12d are defined and a table TB52 in which correction values for the set values defined in the table TB51 are defined. That is, the table TB51 is a table in which set values of the amplitudes and the phases of the transmission signals passed through the signal paths R11 (the reference paths) of the transmission/reception units 12a to 12d are defined. The table TB52 is a table in which an inter-path error between the signal paths R11 (the reference paths) and the signal paths R12 (the paths other than the reference paths) of the transmission/reception units 12a to 12d is defined.

Specifically, as shown in FIG. 7A, the table TB51 defines set values to be set in the amplitude and phase controllers 22 of the transmission/reception units 12a to 12d for each of beam pattern indexes. Further, as shown in FIG. 7A, the table TB52 defines the correction values for each of the transmission/reception units 12a to 12d. That is, the table TB51 has combinations of set values (set value 1 to 4 is equivalent to 1 combination) corresponding to the number of antenna beam patterns to be set (formed), and the table TB52 has correction values corresponding to the number of the transmission/reception units 12a to 12d.

FIG. 7B is a diagram describing part of a configuration of the controller according to the fifth embodiment. As shown in FIG. 7B, the controller 13 of the present embodiment is configured to output corresponding four set values ("set value 1" to "set value 4") with respect to a designated beam pattern index. Further, the controller 13 of the present embodiment is configured to also output four corrected set values obtained by correcting these four set values using the correction values ("correction value 1" to "correction value 4") of the table TB52. Four symbols "O" (circular shape) in FIG. 7B indicate operators that perform correction operations for set values. This operator performs operations such as multiplication of an amplitude (or addition by a decibel value) and addition of a phase angle, for example.

When the beam pattern index is designated, the four set values read from the table TB51 of the memory M are output to the amplitude and phase controllers 22 of the transmission/reception units 12a to 12d, respectively. Further, when the beam pattern index is designated, the four corrected set values output from the controller 13 are output to the amplitude and phase controllers 26 of the transmission/reception units 12a to 12d, respectively.

As described above, the set values defined in the table TB51 are used to control the amplitudes and the phases of the transmission signals passed through the signal paths R11 (the reference paths) of the transmission/reception units 12a to 12d. In contrast, the corrected set values obtained by using the correction values defined in the table TB52 are used to control the amplitudes and the phases of the reception signals passed through the signal paths R12 (the signal paths other than the reference paths) of the transmission/reception units 12a to 12d. Although the table TB51 needs to be corrected using the correction values defined in the table TB52, the table TB51 is shared by the signal paths R11 and R12.

The phased array antenna of the present embodiment is different from the phased array antenna 1 of the first embodiment in that the amplitude and the phase of the reception signal passed through the signal path R12 are controlled by using the corrected set values obtained by correcting the set values defined in the table TB51. However, since the basic operation of the phased array antenna of the present embodiment is the same as that of the phased array antenna 1 of the first embodiment, detailed description thereof will be omitted.

As described above, in the present embodiment, as in the first embodiment, the antenna element is shared by the signal path R11 through which the transmission signal is passed and the signal path R12 through which the reception signal is passed. Further, the memory M stores the table TB51 in which the set values of the amplitudes and the phases of the transmission signals passed through the signal paths R11 of the transmission/reception units 12a to 12d are defined and the table TB52 in which the correction values for the set values defined in the table TB51 are defined.

Then, the amplitudes and the phases of the transmission signals passed through the signal paths R11 are controlled by using the table TB51 stored in the memory M. Further, the amplitudes and the phases of the transmission signals passed through the signal paths R12 are controlled by using the corrected set values obtained by correcting the set values defined in the table TB51 with the correction values defined in the table TB52. Therefore, even if there is an inter-path error between the signal paths R11 and R12, the desired antenna beam pattern can be formed.

The amount of memory required to store the table TB51 is equivalent to 32 words, and the amount of memory required to store the table TB52 is equivalent to 4 words. In the present embodiment, the amount of memory required to store all of the set values and the correction values is equivalent to 36 words. Therefore, comparing with the required amount of memory (64 words) in a case where the set values are not shared between the transmission signals and the reception signals, it is able to reduce the amount of memory required to form the desired antenna beam pattern.

Sixth Embodiment

A phased array antenna according to a sixth embodiment has the similar configuration as the phased array antenna 2 shown in FIG. 3. However, the phased array antenna of the present embodiment is different from the phased array antenna 2 shown in FIG. 3 in the contents of the memory M of the controller 13 and part of the configuration of the controller 13.

FIG. 8A is a diagram showing an example of the contents of the memory according to the sixth embodiment. In the present embodiment, the memory M of the controller 13 stores a table TB61 in which set values to be set in the amplitude and phase controllers 22 of the transmission/reception units 14a to 14d are defined and tables TB62 to TB64 in which correction values for the set values defined in the table TB61 are defined.

That is, the table TB61 is a table in which set values of the amplitudes and the phases of the transmission signals passed through the signal paths R21 (the reference paths) of the transmission/reception units 14a to 14d are defined. The table TB62 is a table in which an inter-path error between the signal paths R21 (the reference paths) and the signal paths R22 (the paths other than the reference paths) of the transmission/reception units 14a to 14d is defined. The table TB63 is a table in which an inter-path error between the signal paths R21 (the reference paths) of the transmission/reception units 14a to 14d and the signal paths R23 (the paths other than the reference paths) of the transmission/reception units 15a to 15d is defined. The table TB64 is a table in which an inter-path error between the signal paths R21 (the reference paths) of the transmission/reception units 14a to 14d and the signal paths R24 (the paths other than the reference paths) of the transmission/reception units 15a to 15d is defined.

Specifically, as shown in FIG. 8A, the table TB61 defines set values to be set in the amplitude and phase controllers 22 of the transmission/reception units 14a to 14d for each of beam pattern indexes. Further, as shown in FIG. 8A, the table TB62 defines the correction values for each of the transmission/reception units 14a to 14d, and the tables TB63 and TB64 define the correction values for each of the transmission/reception unit 15a to 15d as shown in FIG. 8A.

That is, the table TB61 has combinations of set values (set value 1 to 4 is equivalent to 1 combination) corresponding to the number of antenna beam patterns to be set (formed). The table TB62 has correction values corresponding to the number of transmission/reception units 14a to 14d, and the tables TB63 and TB64 each have correction values corresponding to the number of the transmission/reception units 15a to 15d.

Figure 8B:
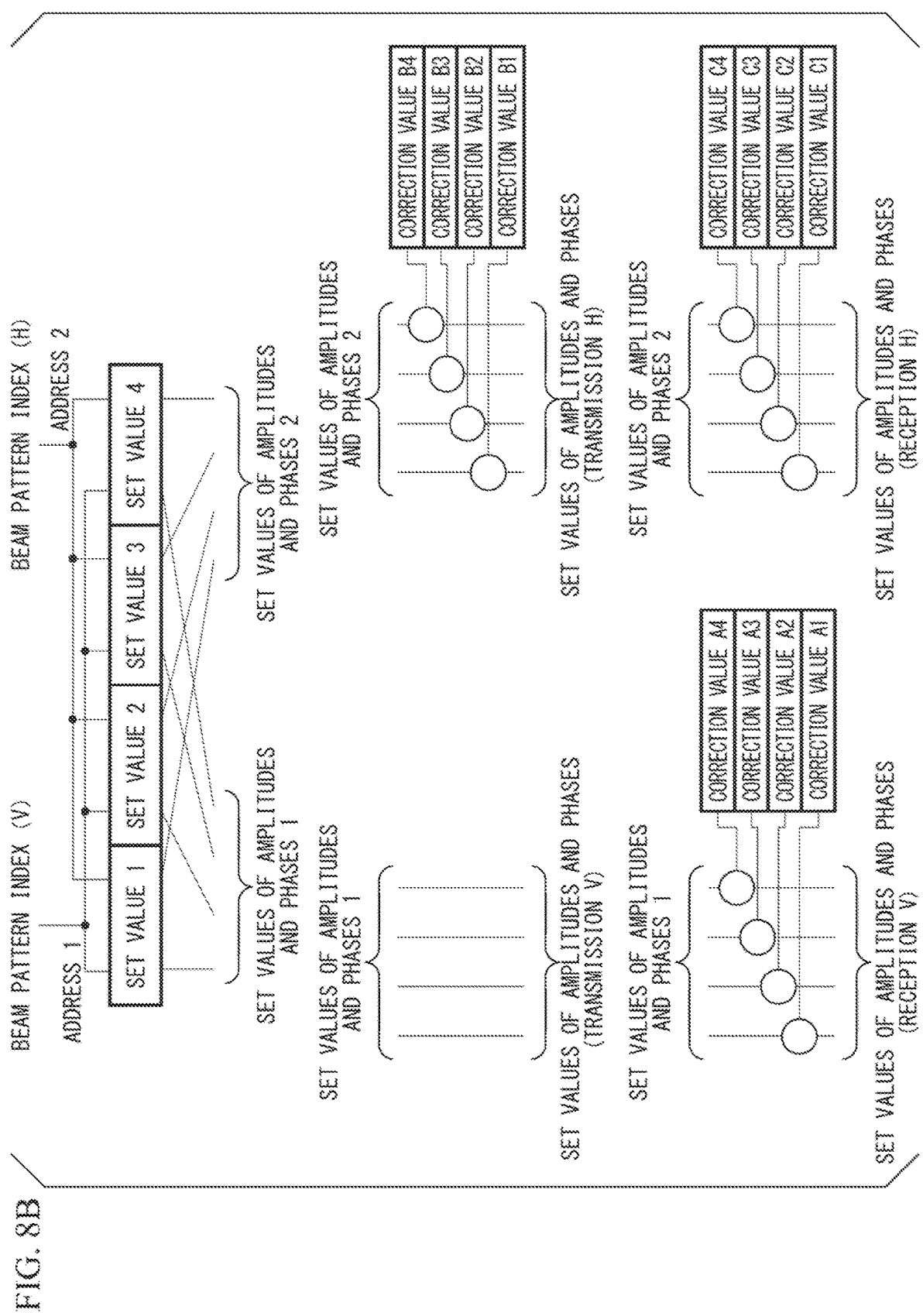
FIG. 8B is a diagram describing part of a configuration of a controller according to the sixth embodiment.

FIG. 8B is a diagram describing part of a configuration of the controller according to the sixth embodiment. As shown in FIG. 8B, the controller 13 of the present embodiment is configured to output corresponding four set values ("set value 1" to "set value 4") with respect to a designated beam pattern index for V polarization. Further, the controller 13 of the present embodiment is configured to also output four corrected set values (hereinafter referred to as "first corrected set values") obtained by correcting these four set values using the correction values ("correction value CA1" to "correction value CA4") of the table TB62.

Further, when a beam pattern index for H polarization is designated, the controller 13 of the present embodiment is configured to output corrected set values obtained by correcting four set values ("set value 1" to "set value 4") for the beam pattern index. Specifically, the controller 13 of the present embodiment is configured to output four corrected set values (hereinafter referred to as "second corrected set values") corrected using the correction values ("correction value CB1" to "correction value CB4") of the table TB63. Further, the controller 13 of the present embodiment is configured to output four corrected set values (hereinafter referred to as "third corrected set values") corrected using the correction values ("correction value CC1" to "correction value CC4") of the table TB64.

The controller 13 can individually designate the beam pattern index for V polarization and the beam pattern index for H polarization. Here, since different set values can be simultaneously read from the table TB61 in the beam pattern index for V polarization and the beam pattern index for H polarization, it is desirable to use a dual port memory as the memory M as in the second embodiment. Twelve 12 symbols "O" in FIG. 8B are the same as the operators shown in FIG. 7B.

When the beam pattern index for V polarization is designated, the four set values read from the table TB61 of the memory M are output to the amplitude and phase controllers 22 of the transmission/reception units 14a to 14d, respectively. Further, the first corrected set values are output to the amplitude and phase controllers 26 of the transmission/reception units 14a to 14d, respectively. When the beam pattern index for H polarization is designated, the second corrected set values are output to the amplitude and phase controllers 22 of the transmission/reception units 15a to 15d, respectively, and the third corrected set values are output to the amplitude and phase controllers 26 of the transmission/reception units 15a to 15d, respectively.

As described above, the set values defined in the table TB61 are used to control the amplitudes and the phases of the transmission signals passed through the signal paths R21 (the reference paths) of the transmission/reception units 14a to 14d. In contrast, the first corrected set values obtained by using the correction values defined in the table TB62 are used to control the amplitudes and the phases of the reception signals passed through the signal paths R22 (the signal paths other than the reference paths) of the transmission/reception units 14a to 14d.

Further, the second corrected set values obtained by using the correction values defined in the table TB63 are used to control the amplitudes and the phases of the transmission signals passed through the signal paths R23 (the signal paths other than the reference paths) of the transmission/reception units 15a to 15d. Further, the third corrected set values obtained by using the correction values defined in the table TB64 are used to control the amplitudes and the phases of the reception signals passed through the signal paths R24 (the signal paths other than the reference paths) of the transmission/reception units 15a to 15d. Although the table TB61 needs to be corrected using the correction values defined in the tables TB62 to TB64, the table TB61 is shared by the signal paths R21 to R24.

The phased array antenna of the present embodiment is different from the phased array antenna 2 of the second embodiment in that the corrected set values obtained by correcting the set values defined in the table TB61 are used as the set values of the signal paths R22 to R24. However, since the basic operation of the phased array antenna of the present embodiment is the same as that of the phased array antenna 2 of the second embodiment, detailed description thereof will be omitted.

As described above, in the present embodiment, the antenna element is shared by the four signal paths (the signal paths R21 to R24) as in the second embodiment. Further, the memory M stores the table TB61 in which the set values for the signal path R21 are defined and the tables TB62 to TB64 in which the correction values for the set values defined in the table TB61 are defined.

Then, the amplitude and the phase of the transmission signal passed through the signal path R21 are controlled by using the set values of the table TB61. Further, the amplitudes and the phases of the signals passed through the signal paths R22 to R24 are controlled, respectively, by using the first to third corrected set values obtained by correcting the set values defined in the table TB61 with the correction values defined in the tables TB62 to TB64. Therefore, even if there is an inter-path error between the signal path R21 and the signal paths R22 to R24, the desired antenna beam pattern can be formed.

The amount of memory required to store the table TB61 is equivalent to 32 words, and the amount of memory required to store the tables TB62 to TB64 is equivalent to 12 words. In the present embodiment, the amount of memory required to store all of the set values and the correction values is equivalent to 44 words. Therefore, comparing with the required amount of memory (128 words) in a case where the set values are not shared, it is able to reduce the amount of memory required to form the desired antenna beam pattern.

Seventh Embodiment

A phased array antenna according to a seventh embodiment has substantially the same configuration as the phased array antenna of the fifth embodiment, and the overall configuration is substantially the same as the phased array antenna 1 shown in FIG. 1. However, the phased array antenna of the present embodiment is slightly different from the phased array antenna of the fifth embodiment in the contents of the memory M of the controller 13 and part of the configuration of the controller 13.

Figures 9A, 9B:
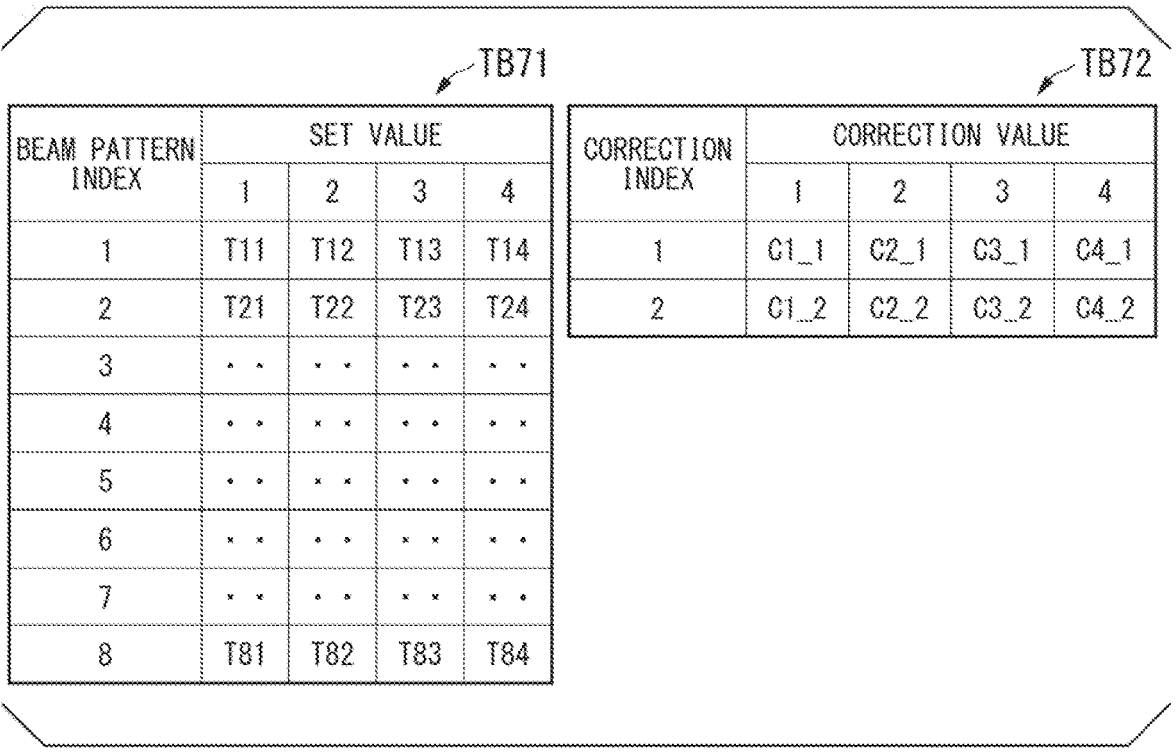
FIG. 9A is a diagram showing an example of the contents of a memory according to a seventh embodiment.
FIG. 9B is a diagram showing a selection example of a correction index according to the seventh embodiment.

FIG. 9A is a diagram showing an example of the contents of the memory according to the seventh embodiment. In the present embodiment, the memory M of the controller 13 stores a table TB71 in which set values to be set in the amplitude and phase controllers 22 of the transmission/reception units 12a to 12d are defined and a table TB72 in which correction values for the set values defined in the table TB71 are defined.

The table TB71 is the same as the table TB51 shown in FIG. 7A, and is a table in which set values of the amplitudes and the phases of the transmission signals passed through the signal paths R11 (the reference paths) of the transmission/reception units 12a to 12d are defined. Similar to the table TB52 shown in FIG. 7A, the table TB72 is a table in which an inter-path error between the signal paths R11 (the reference paths) and the signal paths R12 (the paths other than the reference paths) of the transmission/reception units 12a to 12d is defined. However, the table TB72 is different from the table TB52 shown in FIG. 7A in that a plurality of the above-mentioned inter-path errors are defined.

The reason for defining the plurality of inter-path errors in this way is to make the corrected set values used for controlling the amplitude and the phase of the reception signals passed through the signal path R12 more appropriate depending on the antenna beam pattern to be set (formed). The plurality of inter-path errors defined in the table TB72 are specified by a correction index. In the example shown in FIG. 9A, two inter-path errors specified by the correction index are defined in the table TB72.

FIG. 9B is a diagram showing a selection example of the correction index according to the seventh embodiment. As shown in FIG. 9B, the correction index is selected for each of beam pattern indexes. In the table TB72 shown in FIG. 9A, the correction index can take values "1" or "2". Therefore, as shown in FIG. 9B, "1" or "2" is selected as the value of the correction index for each beam pattern index.

Figure 9C:
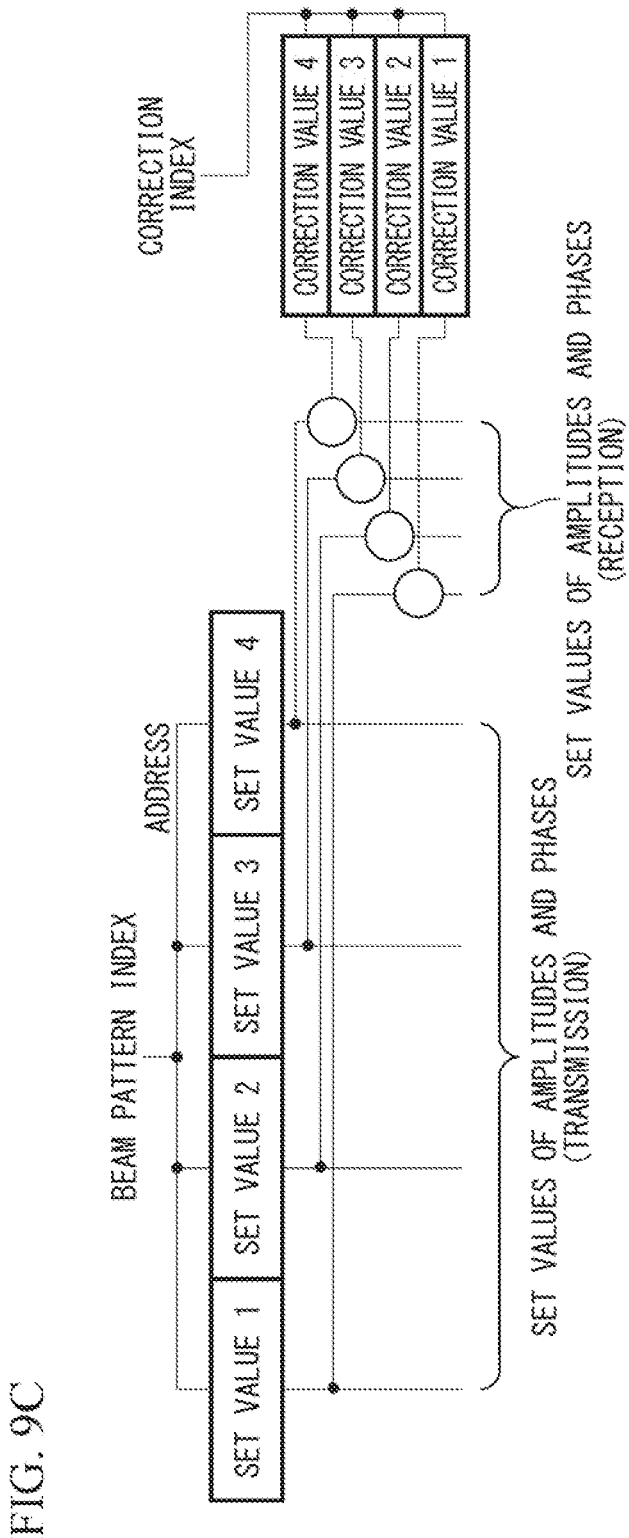
FIG. 9C is a diagram describing part of a configuration of a controller according to the seventh embodiment.

FIG. 9C is a diagram describing part of a configuration of the controller according to the seventh embodiment. As shown in FIG. 9C, the controller 13 of the present embodiment has substantially the same configuration as that shown in FIG. 7B. However, the controller 13 of the present embodiment is different from the controller shown in FIG. 7B in a point that a correction index corresponding to the beam pattern index is selected (see FIG. 9B), and the set values are corrected using correction values ("correction value 1" to "correction value 4") specified by the selected correction index.

The phased array antenna of the present embodiment is different from the phased array antenna of the fifth embodiment in a point that the plurality of inter-path errors between the signal paths R11 and the signal paths R12 of the transmission/reception units 12a to 12d are defined. However, since the basic operation of the phased array antenna of the present embodiment is the same as that of the phased array antenna of the fifth embodiment, detailed description thereof will be omitted.

As described above, in the present embodiment, as in the fifth embodiment (the first embodiment), the antenna element is shared by the signal path R11 through which the transmission signal is passed and the signal path R12 through which the reception signal is passed. Further, the memory M stores the table TB71 in which the set values of the amplitudes and the phases of the transmission signals passed through the signal paths R11 of the transmission/reception units 12a to 12d are defined and the table TB72 in which a plurality of the correction values for the set values defined in the table TB71 are defined.

Then, the amplitudes and the phases of the transmission signals passed through the signal paths R11 are controlled by using the table TB71 stored in the memory M. Further, the amplitudes and the phases of the transmission signals passed through the signal paths R12 are controlled by using the corrected set values obtained by correcting the set values defined in the table TB71 with the correction values defined in the table TB72. Therefore, even if there is an inter-path error between the signal paths R11 and R12, the desired antenna beam pattern can be formed.

As described above, since the table TB71 is the same as the table TB51 shown in FIG. 7A, the amount of memory required to store the table TB71 is equivalent to 32 words. Further, the amount of memory required to store the table TB72 is equivalent to 8 words (i.e., 4 words times 2 indexes). In the present embodiment, the amount of memory required to store all of the set values and the correction values is equivalent to 40 words. Therefore, comparing with the required amount of memory (64 words) in a case where the set values are not shared between the transmission signals and the reception signals, it is able to reduce the amount of memory required to form the desired antenna beam pattern.

Further, in the present embodiment, the table TB72 is defined with a plurality of the correction values for the set values defined in the table TB71. Therefore, in the present embodiment, it is possible to make the corrected set values used for controlling the amplitude and the phase of the reception signals passed through the signal path R12 more appropriate depending on the antenna beam pattern to be set (formed). When a control error of the amplitude and phase controller 26 provided in the signal path R12 cannot be ignored, it is possible to reduce the control error by selecting an appropriate correction value.

Eighth Embodiment

A phased array antenna according to an eighth embodiment has substantially the same configuration as the phased array antenna of the sixth embodiment, and the overall configuration is substantially the same as the phased array antenna 2 shown in FIG. 3. However, the phased array antenna of the present embodiment is slightly different from the phased array antenna of the sixth embodiment in the contents of the memory M of the controller 13 and part of the configuration of the controller 13.

FIG. 10A is a diagram showing an example of the contents of the memory according to the eighth embodiment. In the present embodiment, the memory M of the controller 13 stores a table TB81 in which set values to be set in the amplitude and phase controllers 22 of the transmission/reception units 14a to 14d are defined and tables TB72 to TB74 in which correction values for the set values defined in the table TB81 are defined.

The table TB81 is the same as the table TB61 shown in FIG. 8A, and is a table in which set values of the amplitudes and the phases of the transmission signals passed through the signal paths R21 (the reference paths) of the transmission/reception units 14a to 14d are defined. Similar to the table TB62 shown in FIG. 8A, the table TB82 is a table in which an inter-path error between the signal paths R21 (the reference paths) and the signal paths R22 (the paths other than the reference paths) of the transmission/reception units 14a to 14d is defined.

Similar to the table TB63 shown in FIG. 8A, the table TB83 is a table in which an inter-path error between the signal paths R21 (the reference paths) of the transmission/reception units 14a to 14d and the signal paths R23 (the paths other than the reference paths) of the transmission/reception units 15a to 15d is defined. Similar to the table TB64 shown in FIG. 8A, the table TB84 is a table in which an inter-path error between the signal paths R21 (the reference paths) of the transmission/reception units 14a to 14d and the signal paths R24 (the paths other than the reference paths) of the transmission/reception units 15a to 15d is defined.

However, the tables TB82 to TB84 are different from the tables TB62 to TB64 shown in FIG. 8A in a point that a plurality of the above-mentioned inter-path errors are defined. The reason for defining the plurality of inter-path errors in this way is to make the corrected set values used for controlling the amplitude and the phase of the signals passed through the signal paths R22 to R24 more appropriate depending on the antenna beam pattern to be set (formed).

In the example shown in FIG. 10A, two inter-path errors specified by a correction index A are defined in the table TB82. Further, two inter-path errors specified by a correction index B are defined in the table TB83. Further, two inter-path errors specified by a correction index C are defined in the table TB84.

FIG. 10B is a diagram showing a selection example of the correction index according to the eighth embodiment. As shown in FIG. 10B, the correction index A is selected for each of beam pattern indexes for V polarization. The correction indexes B and C are selected for each of beam pattern indexes for H polarization. In the tables TB82 to TB84 shown in FIG. 10A, the correction indexes A to C can take values "1" or "2". Therefore, as shown in FIG. 10B, "1" or "2" is individually selected as the value of the correction indexes A to C for each beam pattern index.

Figure 10C:
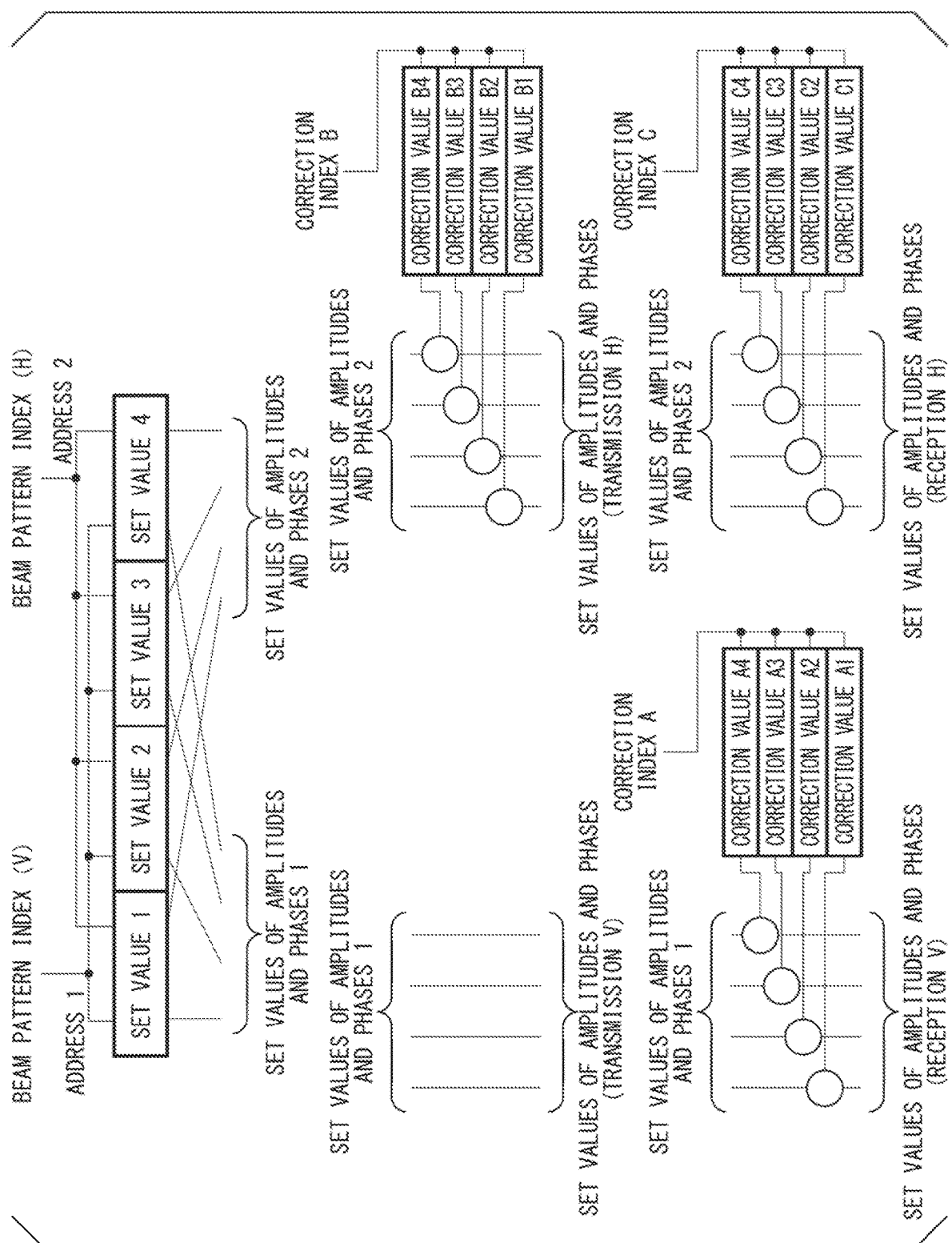
FIG. 10C is a diagram describing part of a configuration of a controller according to the eighth embodiment.

FIG. 10C is a diagram describing part of a configuration of the controller according to the eighth embodiment. As shown in FIG. 10C, the controller 13 of the present embodiment has substantially the same configuration as that shown in FIG. 8B. However, the controller 13 of the present embodiment is different from that shown in FIG. 8B in a point that correction indexes A to C corresponding to the beam pattern index are selected (see FIG. 10B), and the set values are corrected using correction values specified by the selected correction indexes A to C. In the present embodiment, "correction value A1" to "correction value A4" are specified by the correction index A, "correction value B1" to "correction value 84" are specified by the correction index B, and "correction value C1" to "correction value C4" are specified by the correction index C.

The phased array antenna of the present embodiment is different from the phased array antenna of the sixth embodiment in a point that the plurality of inter-path errors between the signal path R21 and the signal path R22 are defined, the plurality of inter-path errors between the signal path R21 and the signal path R23 are defined, and the plurality of inter-path errors between the signal path R21 and the signal path R24 are defined. However, since the basic operation of the phased array antenna of the present embodiment is the same as that of the phased array antenna of the sixth embodiment, detailed description thereof will be omitted.

As described above, in the present embodiment, the antenna element is shared by the four signal paths (the signal paths R21 to R24) as in the sixth embodiment (the second embodiment). Further, the memory M stores the table TB81 in which the set values for the signal path R21 are defined and the tables TB62 to TB64 in which the plurality of correction values for the set values defined in the table TB81 are defined.

Then, the amplitude and the phase of the transmission signal passed through the signal path R21 are controlled by using the set values of the table TB81. Further, the amplitudes and the phases of the signals passed through the signal paths R22 to R24 are controlled, respectively, by using the corrected set values (the first to third corrected set values) obtained by correcting the set values defined in the table TB81 with the correction values defined in the tables TB82 to TB84. Therefore, even if there is an inter-path error between the signal path R21 and the signal paths R22 to R24, the desired antenna beam pattern can be formed.

As described above, since the table TB81 is the same as the table TB61 shown in FIG. 8A, the amount of memory required to store the table TB81 is equivalent to 32 words. Further, the amount of memory required to store the tables TB82 to TB84 is equivalent to 8 words each. In the present embodiment, the amount of memory required to store all of the set values and the correction values is equivalent to 56 words. Therefore, comparing with the required amount of memory (128 words) in a case where the set values are not shared, it is able to reduce the amount of memory required to form the desired antenna beam pattern.

Further, in the present embodiment, the tables TB82 to TB84 are defined with a plurality of the correction values for the set values defined in the table TB81. Therefore, in the present embodiment, it is possible to make the corrected set values used for controlling the amplitudes and the phases of the signals passed through the signal paths R22 to R24 more appropriate depending on the antenna beam pattern to be set (formed). When control errors of the amplitude and phase controllers 22 or the amplitude and phase controllers 26 provided in the signal paths R22 to R24 cannot be ignored, it is also possible to reduce the control errors by selecting an appropriate correction value.

Although the embodiments have been described above, the present invention is not limited to the above embodiments and can be freely modified within the scope of the present invention. For example, in the above-described embodiment, one antenna element is shared by two signal paths R11 and R12, or four signal paths R21 to R24, but the antenna element does not necessarily have to be shared. The antenna element may be provided in each of the two signal paths R11 and R12, or the four signal paths R21 to R24.

However, regardless of whether the antenna element is shared by a plurality of signal paths or the antenna element is not shared by a plurality of signal paths, it is desirable that conditions such as the wiring length of each signal path are uniformly arranged. When it is difficult to uniformly arrange the above conditions due to physical restrictions, mounting errors, control errors of the amplitude and phase controllers 22 and 26, and the like, as in the fifth to eighth embodiments, a correction value may be provided to correct the set value.

Further, in the above-described embodiment, the transmission/reception of signals (radio signals) has been realized by the TDD system, but it is not always necessary to transmit and receive the signals. It may be one that only transmits a signal, or it may be one that only receives a signal. For example, only transmission of a signal of V polarization and a signal of H polarization may be performed, or reception of a signal of V polarization and a signal of H polarization may be performed. Further, the present invention may be applied to a full-duplex system that simultaneously transmits and receives signals by employing an appropriate transmission signal canceller.

Further, when the correction operation is performed as in the fifth to eighth embodiments described above, it is conceivable that phase wrapping occurs after the correction (i.e., the corrected phase may exceed $\pm\pi$). When such phase wrapping occurs, it is desirable to perform a modulo operation or the like to keep the corrected phase within a range of $\pm r$.

Further, in the above-described embodiments, the set values are shared in all of the beam pattern indexes. However, the set values may be shared in at least one beam pattern index (i.e., at least one antenna beam pattern to be set). In a case where the number of the beam pattern indexes in which the set values are shared is small, it is preferable to lessen the number of the correction values and the number of words.

FIG. 11 is a diagram showing another example of the contents of the memory. As shown in FIG. 11, the table TB90 of this example includes three tables TB91 to TB93. The table TB91 is a table in which the set values used in a case where the beam pattern index is 1 to 6 are defined. The table TB92 and TB93 are tables in which the set values used in a case where the beam pattern index is 7 or 8 are defined.

The set value defined in the table TB91 is, for example, used for controlling the amplitudes and the phases of the transmission signals passed through the signal paths R11 and the amplitudes and the phases of the reception signals passed through the signal paths R12 of each transmission/reception units 12a to 12d in the phased array antenna 1 shown in FIG. 1. That is, the table TB91 is shared between the signal paths R11 and R12, in relation to the beam pattern indexes 1 to 6.

The set value defined in the table TB92 is, for example, used for controlling the amplitudes and the phases of the transmission signals passed through the signal paths R11 of each transmission/reception units 12a to 12d in the phased array antenna 1 shown in FIG. 1. The set value defined in the table TB93 is, for example, used for controlling the amplitudes and the phases of the reception signals passed through the signal paths R12 of each transmission/reception units 12a to 12d in the phased array antenna 1 shown in FIG. 1.

As described, in this example, the set values are shared in relation to six beam pattern indexes (i.e., the beam pattern indexes 1 to 6) among the beam pattern indexes 1 to 8.

However, the configuration shown in FIG. 11 is merely a one example, and the number of the beam pattern indexes in which the set values are shared is not limited to six, the number may be any of one to five or seven.

REFERENCE SIGNS LIST 1, 2 Phased array antenna
11a to 11d Antenna element
16a to 16d Antenna element
22, 26 Amplitude and phase controller
M Memory
24 Switch
R11, R12 Signal path
R21 to R24 Signal path

The invention claimed is:

1. A phased array antenna comprising:
a plurality of antenna elements;
a plurality of signal paths that are connected to each of the antenna elements;
each of the antenna elements is connected to the plurality of signal paths to function as a transmitter or a receiver,
a storage unit configured to store a set value of at least one of amplitude or phase of a signal passed through at least one predefined reference path among the plurality of signal paths with regard to at least one of the antenna elements, the set value for at least one of antenna beam patterns to be set; and
an amplitude and phase control unit configured to control at least one of the amplitude or the phase of the signal passed through the reference path connected to the one of the antenna elements that the set value thereof is stored in the storage unit, by using the set value stored in the storage unit,
and configured to control amplitude or phase of a signal passed through the signal path other than the reference path connected to the one of the antenna elements by using the set value of the reference path stored in the storage unit,
wherein
the storage unit further stores an inter-path error between the reference path and the signal path other than the reference path, and
the amplitude and phase control unit controls at least one of the amplitude or the phase of the signal passed through the signal path other than the reference path, by using a corrected set value obtained by correcting the set value stored in the storage unit by the inter-path error.

2. The phased array antenna according to claim 1, wherein the storage unit is configured to store the set values for all of the antenna elements.

3. The phased array antenna according to claim 1, wherein the storage unit stores a plurality of the inter-path errors, and
the amplitude and phase control unit selects one of the inter-path errors depending on the antenna beam patterns to be set.

4. The phased array antenna according to claim 1, wherein the plurality of signal paths include:
transmission signal paths through which a plurality of transmission signals transmitted from each of the antenna elements are passed, and
reception signal paths through which a plurality of reception signals received by each of the antenna elements are passed.

5. The phased array antenna according to claim 1, wherein the plurality of signal paths include:
a first transmission signal path through which a transmission signal, which is transmitted as a signal in a first polarization state from each of the antenna elements, is passed,
a first reception signal path through which a reception signal, which is obtained by receiving the signal in the first polarization state by each of the antenna elements, is passed,
a second transmission signal path through which a transmission signal, which is transmitted as a signal in a second polarization state from each of the antenna elements, is passed, and
a second reception signal path through which a reception signal, which is obtained by receiving the signals in the second polarization state by each of the antenna elements, is passed.

6. The phased array antenna according to claim 1, further comprising:
a switching unit configured to sequentially switch the signal paths.

7. The phased array antenna according to claim 1, wherein the set values are provided as many as the number of the antenna beam patterns to be set.

8. The phased array antenna according to claim 1, wherein the set values are provided only for part of the antenna beam patterns to be set.

9. A phased array antenna comprising:
a plurality of antenna elements;
a first transmission signal path through which a transmission signal, which is transmitted as a signal in a first polarization state from each of the antenna elements, is passed;
a first reception signal path through which a reception signal, which is obtained by receiving the signal in the first polarization state by each of the antenna elements, is passed;
a second transmission signal path through which a transmission signal, which is transmitted as a signal in a second polarization state from each of the antenna elements, is passed;
a second reception signal path through which a reception signal, which is obtained by receiving the signal in the second polarization state by each of the antenna elements, is passed;
a storage unit configured to store a first set value and a second set value for all of the antenna beam patterns to be set with regard to all of the antenna elements, the first set value being a set value of at least one of an amplitude or a phase of any one of the transmission signal passed through the first transmission signal path and the reception signal passed through the first reception signal path, the second set value being a set value of at least one of an amplitude or a phase of any one of the transmission signal passed through the second transmission signal path and the reception signal passed through the second reception signal path; and
an amplitude and phase control unit configured to control at least one of the amplitudes or the phases of the transmission signal passed through the first transmission signal path and the reception signal passed through the first reception signal path, by using the first set value stored in the storage unit, and configured to control at least one of the amplitudes or the phases of the transmission signal passed through the second transmission signal path and the reception signal passed through the second reception signal path, by using the second set value stored in the storage unit.

10. A phased array antenna comprising:
a plurality of antenna elements;
a plurality of signal paths that are connected to each of the antenna elements;
each of the antenna elements is connected to the plurality of signal paths to function as a transmitter or a receiver,
a storage unit configured to store a set value of at least one of amplitude or phase of a signal passed through at least one predefined reference path among the plurality of signal paths with regard to at least one of the antenna elements, the set value for at least one of antenna beam patterns to be set; and
an amplitude and phase control unit configured to control at least one of the amplitude or the phase of the signal passed through the reference path connected to the one of the antenna elements that the set value thereof is stored in the storage unit, by using the set value stored in the storage unit,
and configured to control amplitude or phase of a signal passed through the signal path other than the reference path connected to the one of the antenna elements by using the set value of the reference path stored in the storage unit,
wherein the phased array antenna further comprises a switching unit configured to sequentially switch the signal paths.

* * * * *